March 9, 1954     E. G. WEILER     2,671,546
COIN-CONTROLLED VENDING APPARATUS

Filed July 12, 1948     13 Sheets-Sheet 1

Inventor
Edward G. Weiler

March 9, 1954  E. G. WEILER  2,671,546
COIN-CONTROLLED VENDING APPARATUS
Filed July 12, 1948  13 Sheets-Sheet 2

INVENTOR.
Edward G. Weiler

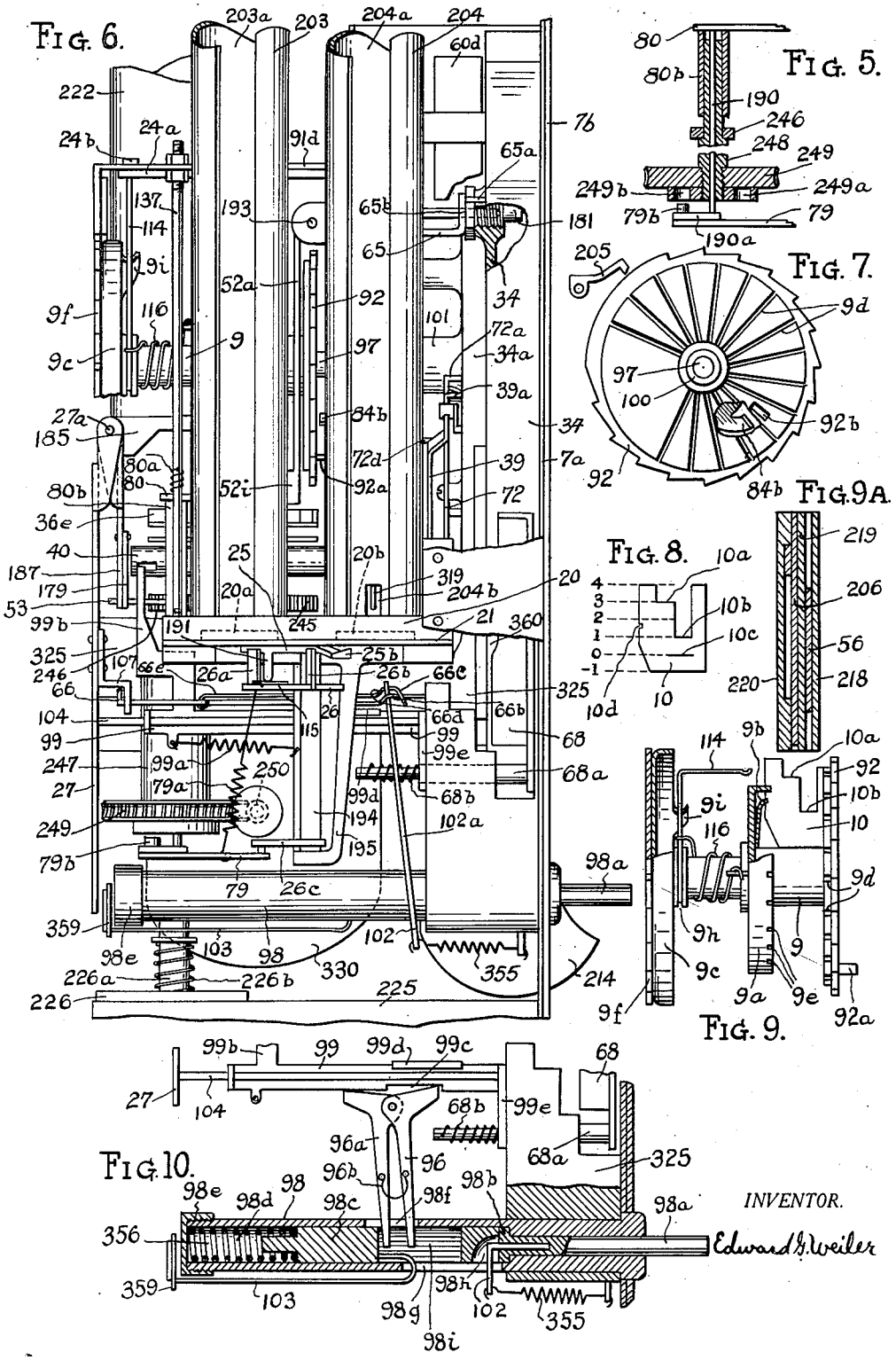

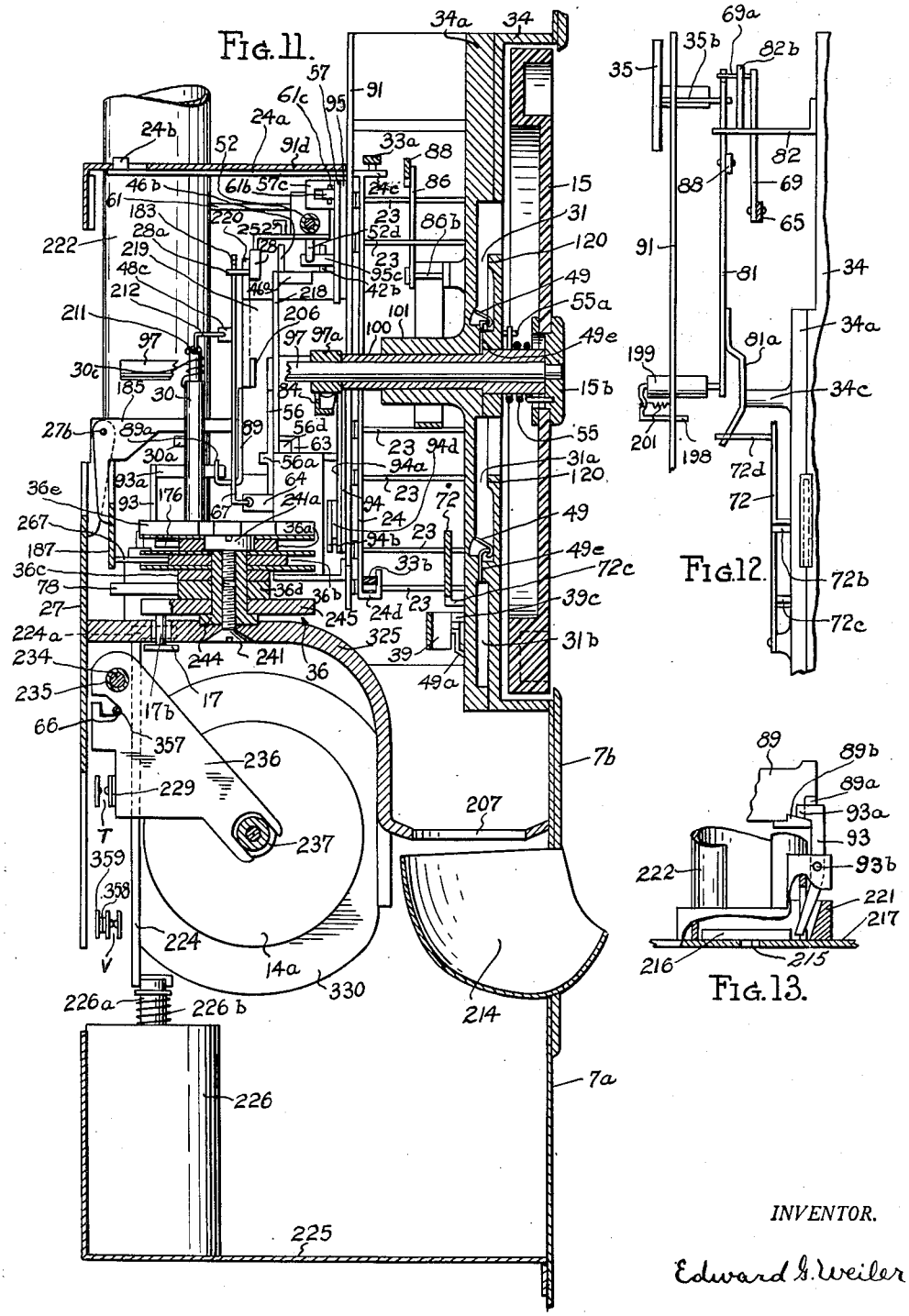

March 9, 1954  E. G. WEILER  2,671,546
COIN-CONTROLLED VENDING APPARATUS
Filed July 12, 1948  13 Sheets-Sheet 5

INVENTOR.
Edward G. Weiler

March 9, 1954  E. G. WEILER  2,671,546
COIN-CONTROLLED VENDING APPARATUS
Filed July 12, 1948  13 Sheets-Sheet 6
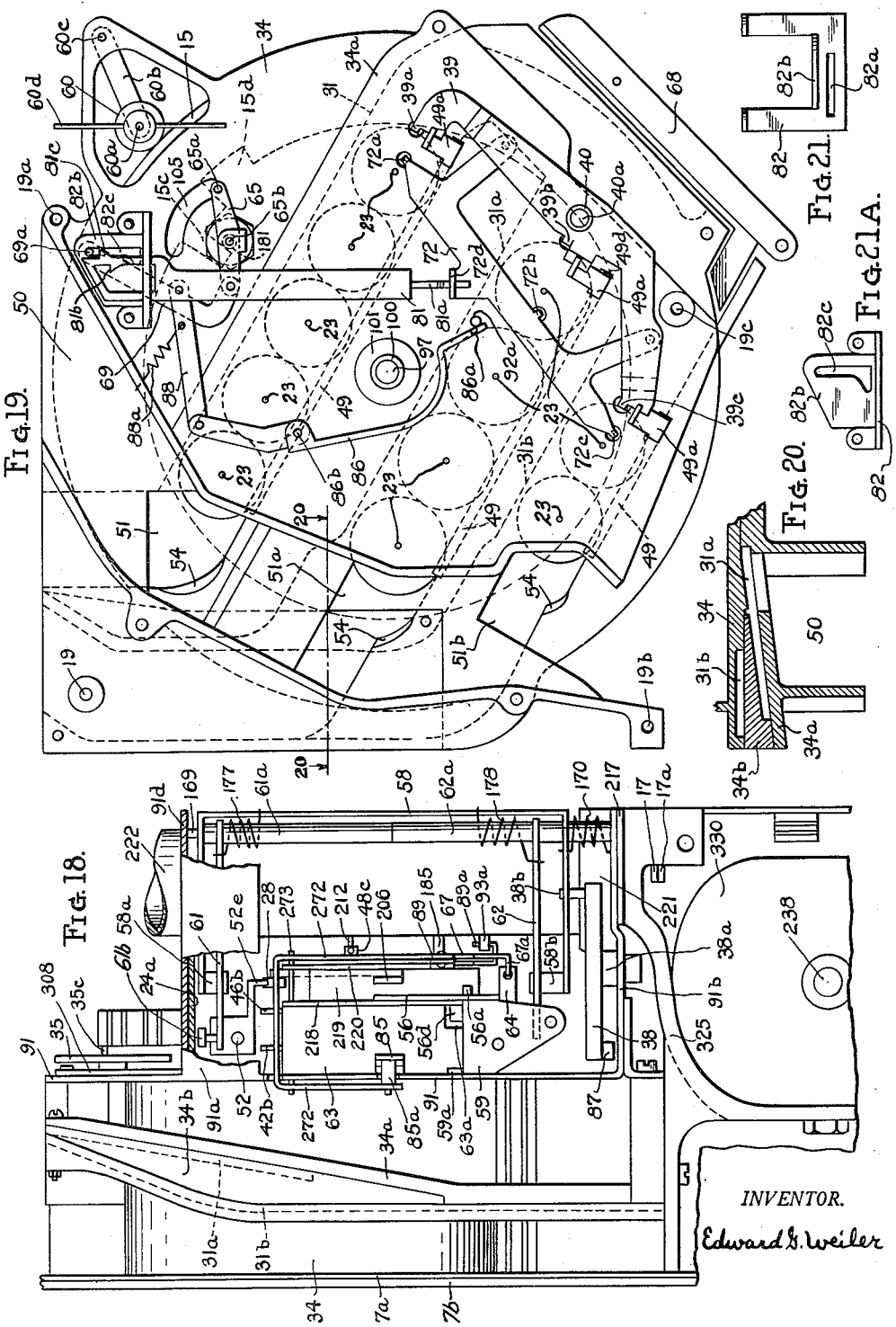
INVENTOR.
Edward G. Weiler

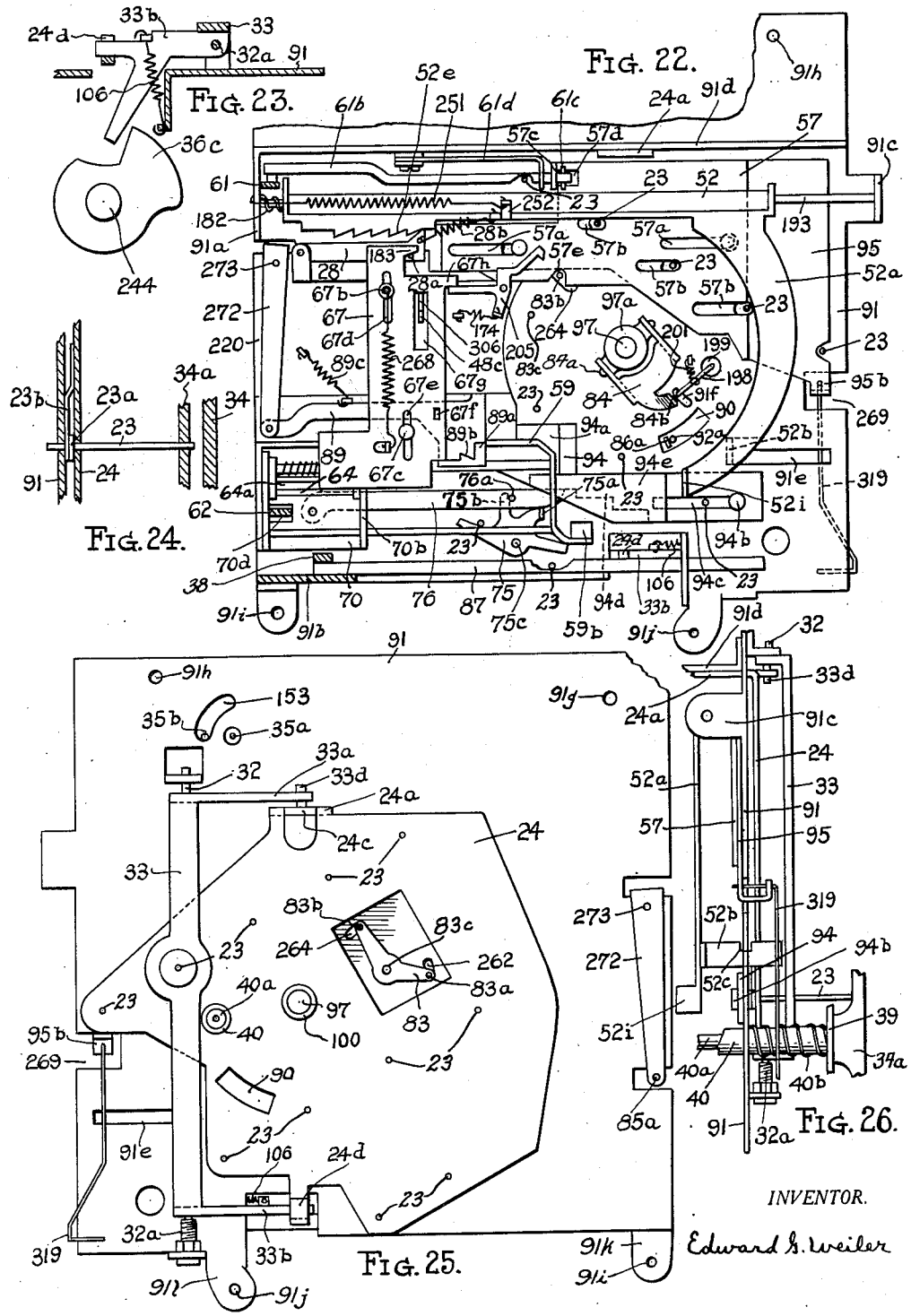

March 9, 1954 — E. G. WEILER — 2,671,546
COIN-CONTROLLED VENDING APPARATUS
Filed July 12, 1948 — 13 Sheets-Sheet 8

INVENTOR.
Edward G. Weiler

Inventor
Edward G. Weiler

March 9, 1954 E. G. WEILER 2,671,546
COIN-CONTROLLED VENDING APPARATUS
Filed July 12, 1948 13 Sheets-Sheet 11
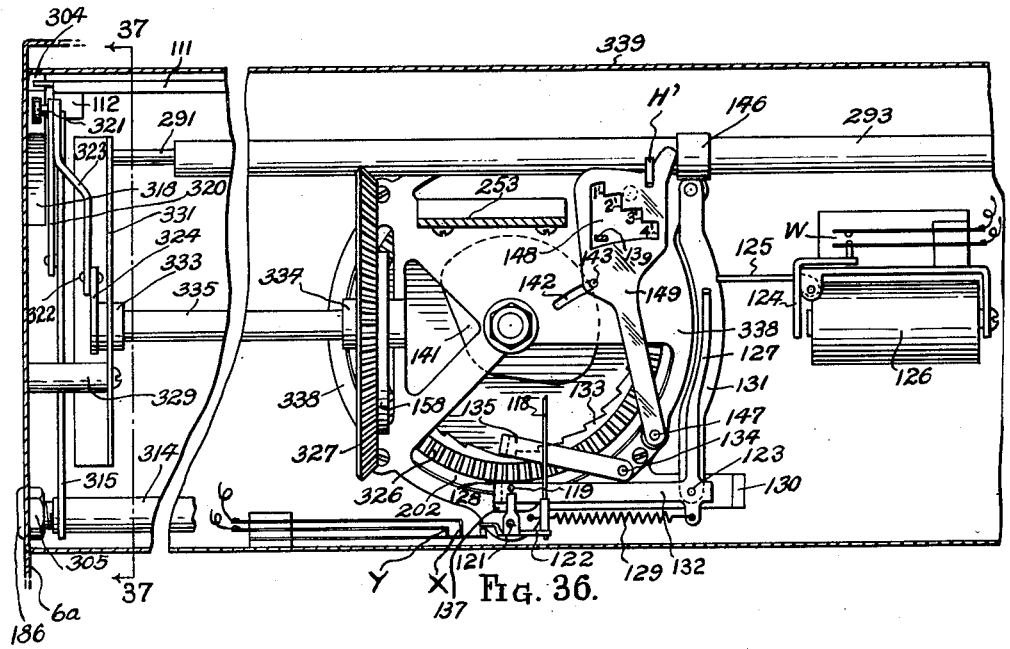
FIG. 36.
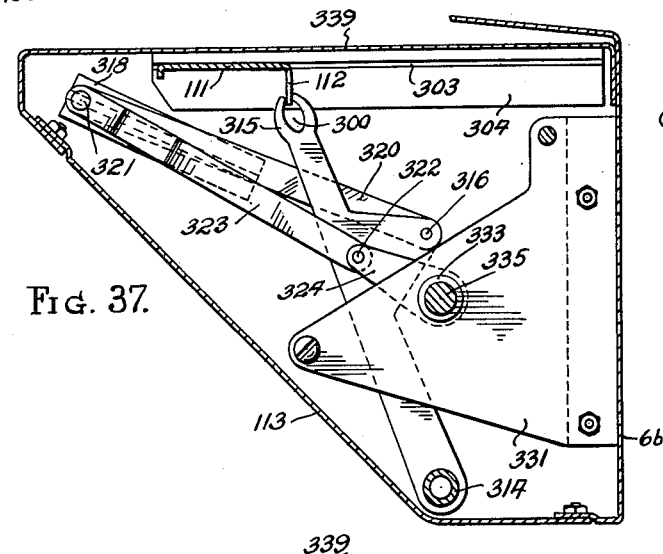
FIG. 37.
FIG. 38.
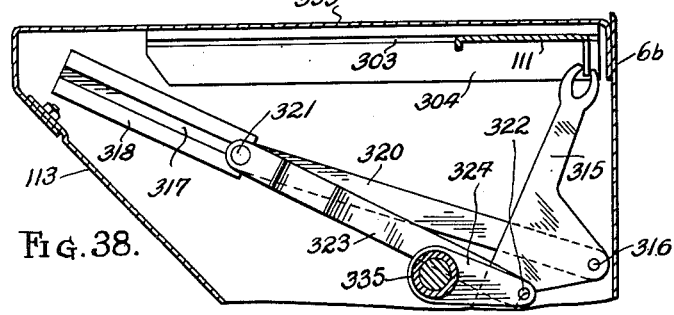
FIG. 39.
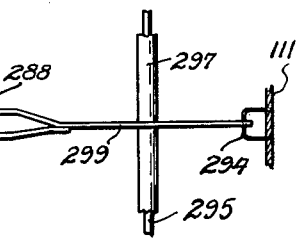
FIG. 36A.
Inventor
Edward G. Weiler

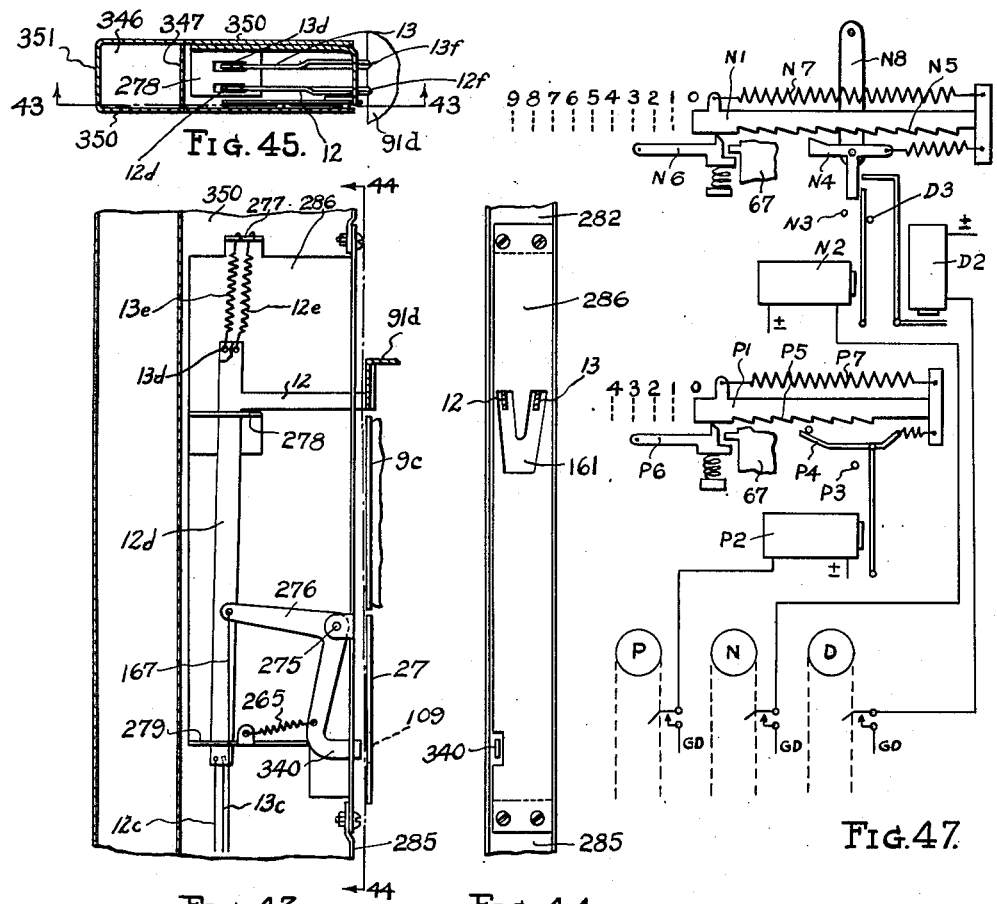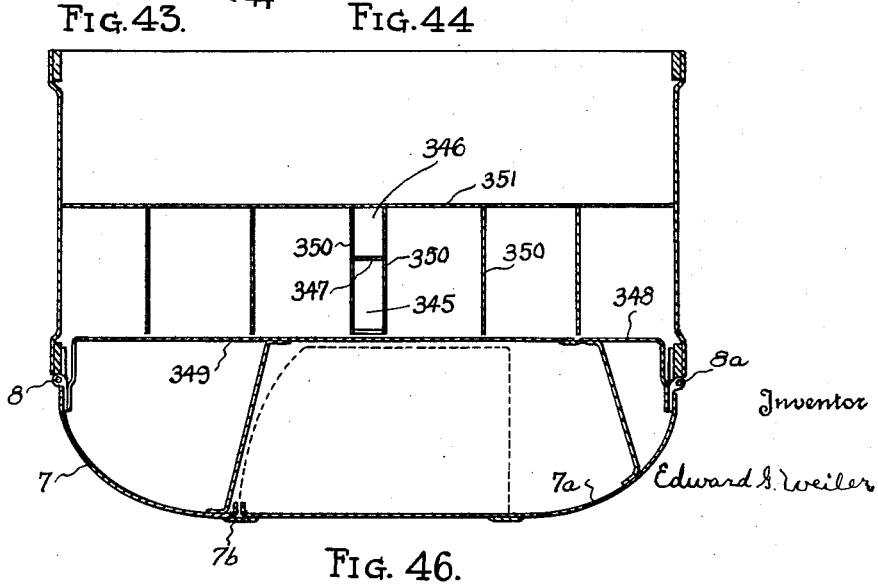

Patented Mar. 9, 1954

2,671,546

UNITED STATES PATENT OFFICE 2,671,546

COIN-CONTROLLED VENDING APPARATUS

Edward G. Weiler, Midland, Mich.

Application July 12, 1948, Serial No. 38,202

31 Claims. (Cl. 194—2)

This invention relates to a vending apparatus. More particularly it comprises a coin operated selective vending machine made up essentially of two separable parts, a delivery unit and a coin and selector unit, the two units being adapted to interact electrically and mechanically to perform the vending operations. The mechanical interaction between the units is performed by a series of feelers in the delivery unit that are placed in normal or unoperated positions relative to the coin and selector unit when the latter unit is mounted in a predetermined position relative to the delivery unit. The coin and selector unit is provided with a dial for setting up selections and for simultaneously presetting the price. Means are provided for receiving coins of various values, for displaying the coins deposited, for totalizing the value of the coins, for selectively actuating the delivery unit, for delivering change, for restoring to normal after merchandise has been delivered and for refunding deposited coins when no merchandise is delivered.

It is the principal object of the invention to provide a coin and selector unit that includes all of the features desirable for selective vending operations so constructed that different types of vending devices may readily be arranged to be operated by it. This unit is compact so that it can normally be fitted into available space in a vending device and because of its universal application to many different types of vending machines economies may be realized in its manufacture.

It is a further object of the invention to obtain the flexibility and ease of operation afforded by an electric control and at the same time to reduce electric controls to some extent by utilizing positively operated mechanical elements to perform functions that would otherwise require electrical devices. The number of electric contacts is thereby reduced to a minimum and the operation made very positive and reliable so as to give best performance with minimum expense and effort in maintaining the equipment in service.

It is a further object of the invention to provide means to totalize the value of various denominations of coins deposited, to measure this value against the price of a selected article, to start the machine when sufficient value in coins is registered and to deliver change for value registered in excess of the price of the article. When change coins are exhausted the device will not operate on transactions requiring change but will operate when the correct amount is deposited.

The annexed drawings and the following description set forth in detail certain mechanism embodying the invention, such disclosed means constituting, however, but one of various mechanical forms in which the principle of the invention may be used.

In said annexed drawings:

Figure 5 is a cross section view of the drive worm gear with its supporting hollow shaft and associated mechanism.

Figure 6 is a left hand side view of the coin and selector unit.

Figure 7 is a fragmentary view showing the selection ratchet wheel.

Figure 8 is a side view of a price plate.

Figure 9 is a side view of the price and selector drum.

Figure 9A is sectional view of the penny and nickel price bars and their guide channels.

Figure 10 is a fragmentary view, partially in section, showing the principal parts of the refund mechanism.

Figure 11 is a vertical cross sectional view taken along the line 11—11 in Figure 2 looking in the direction of the arrows omitting the selector drum.

Figure 12 is a fragmentary view with some parts cut away showing the coin feeler mechanism.

Figure 13 is a fragmentary view, partially in section, of the nickel change check device.

Figure 18 is a right hand side view of the coin and selector unit.

Figure 19 is a rear view of the coin channel and dial mechanism.

Figure 20 is a cross section taken along the line

20—20 in Figure 19 looking in the direction of the arrows.

Figure 21 is a top view of the guide bracket for the dial operated slide bar.

Figure 21A is a rear view of the guide bracket.

Figure 22 is a rear view of the coin totalizer plate and price mechanism.

Figure 23 is a fragmentary view of the coin feeler control cam and associated mechanism.

Figure 24 is a fragmentary view showing a coin feeler pin.

Figure 25 is a front view of the coin totalizer plate and coin feeler pin control mechanism.

Figure 26 is a left hand side view of the device shown in Figure 25.

Figures 27, 28:
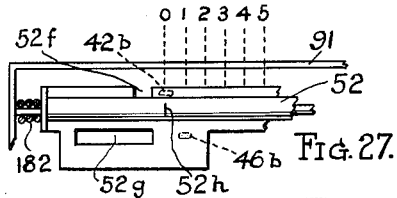

Figure 27 is a top view showing a portion of the penny credit bar.

Figure 28 is a graphic representation of the penny price and credit device.

Figure 29:
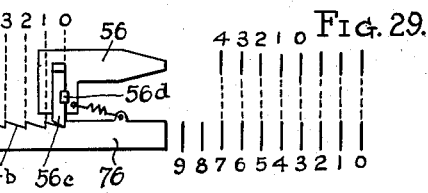

Figure 29 is a graphic representation of the nickel price and credit device.

Figure 30:
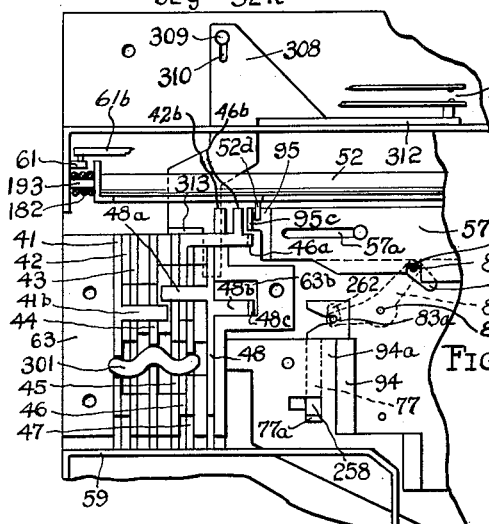

Figure 30 is a rear fragmentary view showing the price and credit control mechanism.

Figure 31:
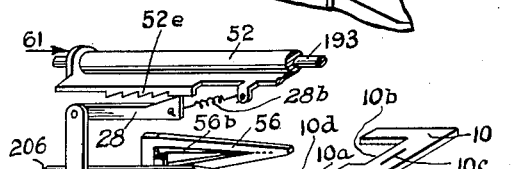

Figure 31 is a perspective view of the price and credit control mechanism.

Figure 32:
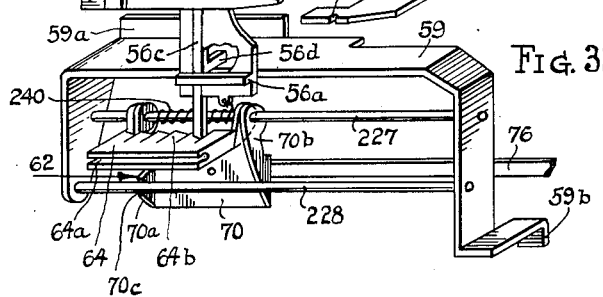

Figure 32 is a fragmentary perspective view illustrating the price and credit checking mechanism.

Figure 33:
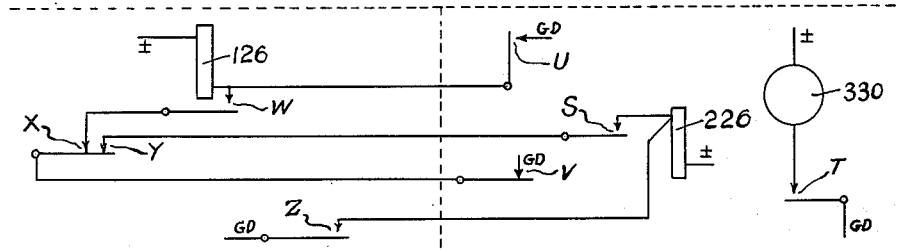

Figure 33 is the simplified electrical circuit of the entire machine.

Figure 34:
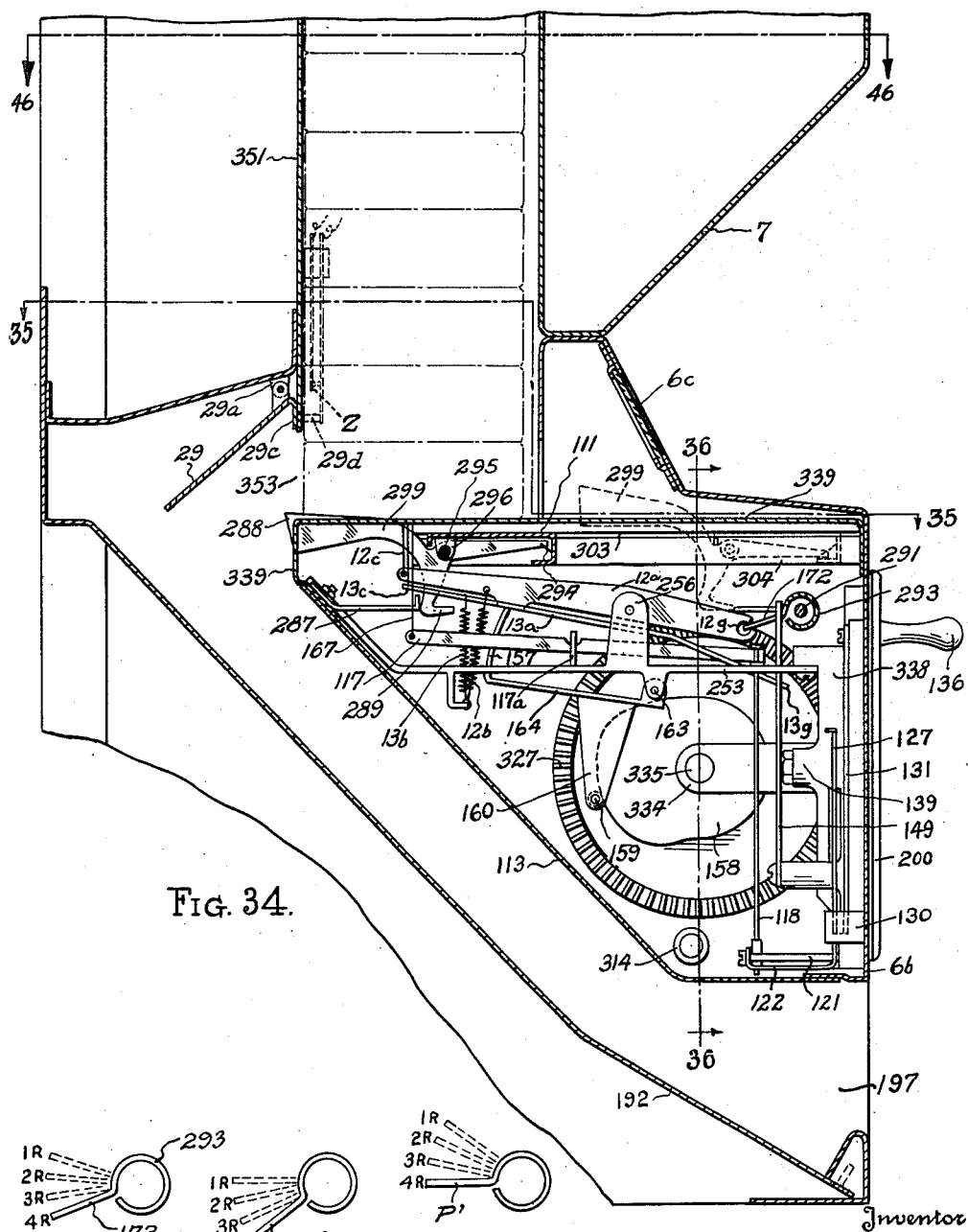
Figure 35:
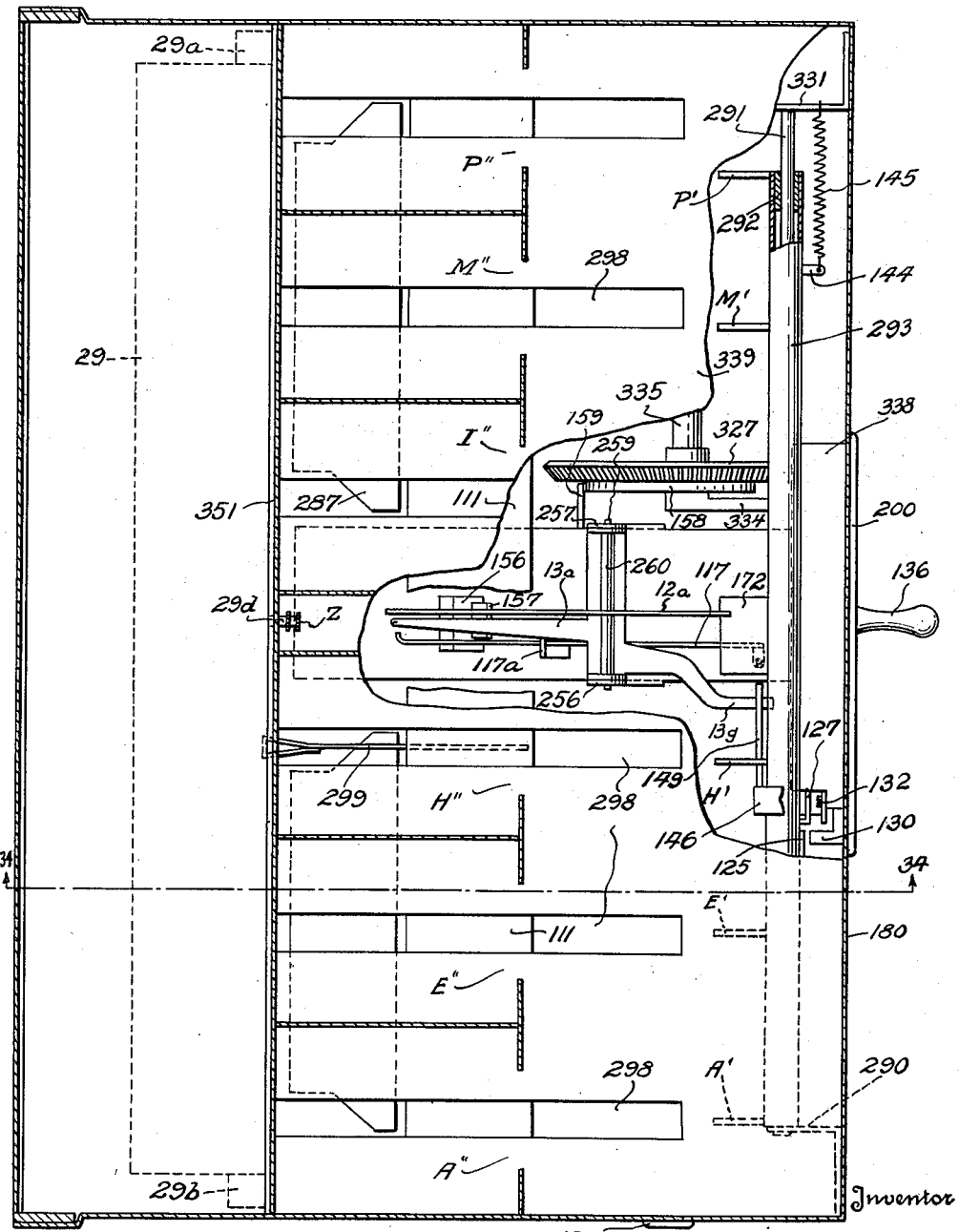

Figure 34 is a detail vertical sectional view indicated by the line 34—34 in Figure 35.

Figure 35 is a horizontal sectional view taken on the line 35—35 of Figure 34.

Figure 36 is a vertical sectional view taken on the line 36—36 of Figure 34 showing the delivery operating mechanism.

Figure 37 is a sectional view taken on the line 37—37 in Figure 36.

Figure 38 is a sectional view of the same apparatus shown in Figure 37 except in partially operated position.

Figure 39 is a top view of a delivery element.

Figures 40, 41:
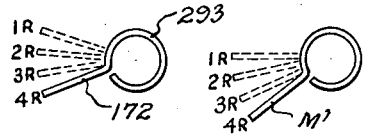

Figure 40 is a view of the selection rack showing diagrammatically the rotary positioning arm.

Figure 41 is a similar view showing a selection pin.

Figure 42:
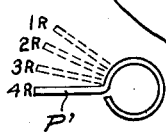

Figure 42 is a similar view showing another selection pin.

Figure 43 is a detail vertical sectional view taken on the line 43—43 in Figure 45 showing the feeler mechanism of the delivery device and its position relative to parts of the coin and selector unit.

Figure 44 is a sectional view taken on the line 44—44 in Figure 43.

Figure 45 is a horizontal view of the device shown in Figure 43.

Figure 46 is a horizontal sectional view through the entire machine, on the line 46—46 in Figure 34, showing in dotted lines the position of the coin and selector unit and omitting the operating mechanism.

Figure 47 is a diagrammatic representation of an alternate method of totalizing the value of coins deposited.

Figure 48:
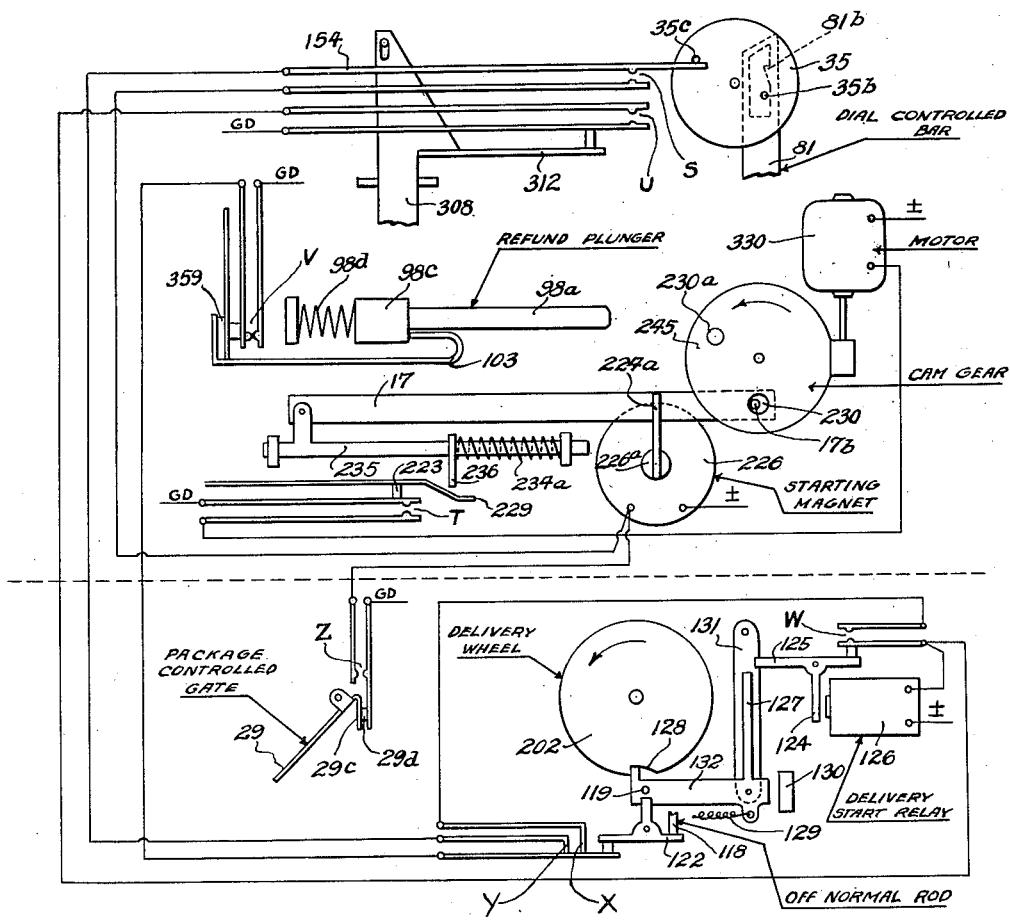

Figure 48 is the electrical circuit of the entire machine showing diagrammatically the various elements which operate the different circuit closing switches.

A summary of reference characters is given at the end of the specification.

GENERAL

Throughout the specification and drawings the numerals 0, 1, 2, 3, 4 and 5 are used to designate the positions in which certain elements may be placed and in no case represent elements themselves. Letters in the series A–P designate arbitrary codes assigned to brands of merchandise vended and appear at windows 6C and also in the holes in the dial 15, Fig. 1, that are used to select the corresponding merchandise. Letters in the series a–p and A'–P' and A"–P" designate elements in the machine used in the storage and selection of brands of merchandise of the corresponding alphabetical series A–P. Letters S–Z designate electric contacts or switches. A series of designations with the same base numeral but with different letters, as for example 9, 9a, 9b, etc., may be used for parts that are closely associated in the machine to facilitate associating these parts on the drawings.

Figure 1:
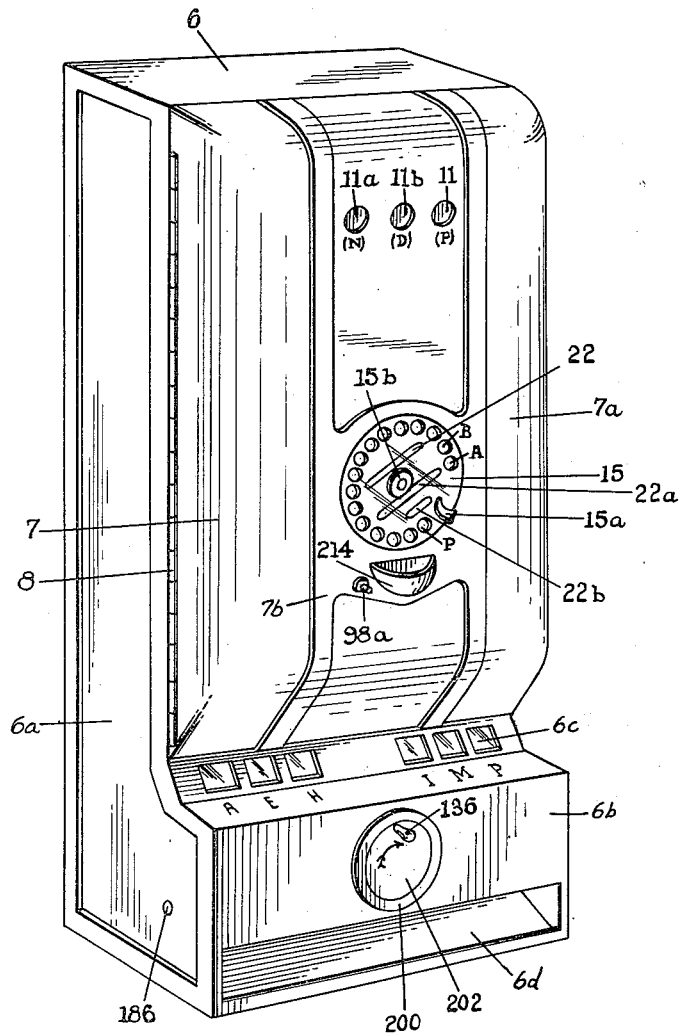
Figure 1 is a perspective view of one form of the apparatus and its enclosing cabinet.

The machine may be housed in a cabinet 6, Figure 1, having doors 7 and 7a, side walls 6a, and a front wall 6b, and consists essentially of mechanisms shown in Figures 2 to 32 inclusive in the drawings which will be referred to as a coin and selector unit and of mechanisms shown in Figures 34 to 47 inclusive referred to as the delivery device.

Within the cabinet the package chutes are formed by a back plate 351, Fig. 46, a series of side wall plates 350 and front plates 348 and 349 which are parts of the door structures. A base plate 339, Fig. 34, forms the floor of the package chutes and contains a slot 298 extending lengthwise of each chute. The wall plates 351 and 350 and a partition plate 347 form a channel 346 for electrical connections and a channel 345 for mechanical connections between the coin and selector unit and the delivery device. The door 7 supported by a hinge 8 includes the plate 349 which, in the structure shown, forms the front wall of all the package chutes except one.

A door 7a supported by a hinge 9a serves as a mounting for the coin and selector unit shown dotted in Fig. 46 and also contains the plate 348 which serves as the front wall of one package chute. Coin entrances 11, 11a and 11b for pennies, nickels and dimes respectively are shown in Fig. 1 and it is to be assumed that genuine coins pass from these coin entrances through suitable coin selectors and enter the penny, nickel or dime channels of the coin and selector unit, Fig. 19. When door 7a is opened, the mechanism of the coin and selector unit is accessible for repairs, for the removal of deposited coins or for the stocking of change coins in the change channels therein. When door 7 is opened, the package chutes are accessible for the stocking of merchandise.

In this description the symbol ± will indicate the live side of an alternating current electric circuit furnishing power to the machine and GD will indicate the grounded side of the circuit. It is to be understood that direct current can also be used to operate the machine. Electric contacts are shown in the various drawings in relation to the mechanical elements which operate them but the electrical connections are shown only in Figures 33 and 48. It is to be understood that any reference to electric circuits hereinafter refers to Figure 33. In these figures all contacts as well as the diagrammatic representations of mechanical elements associated therewith are shown in normal positions representing the condition of the machine ready to be operated by a customer.

Figures 2, 3, 4:
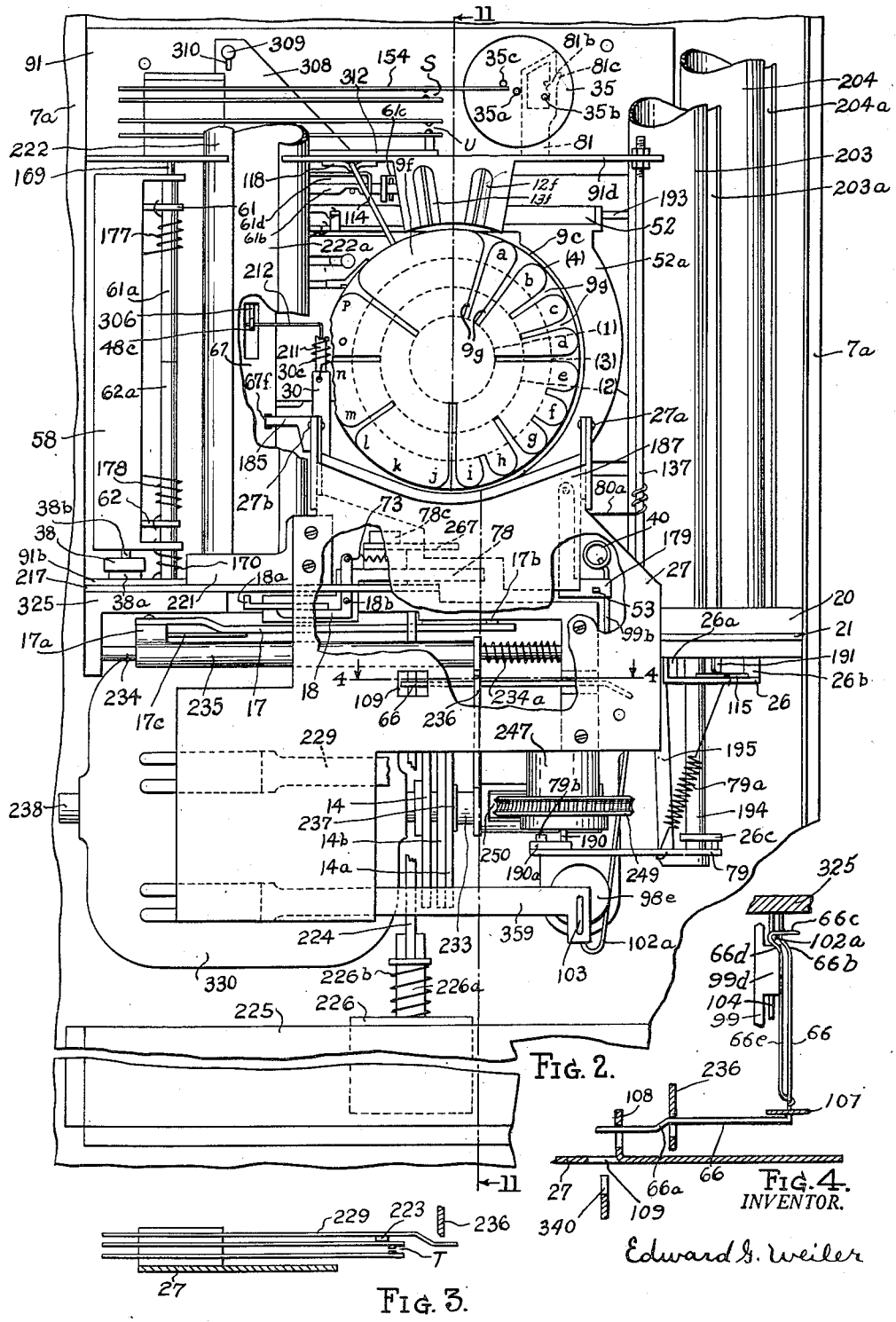
Figure 2 is a rear view of the coin and selector unit.
Figure 3 is a fragmentary view of the motor control contact.
Figure 4 is a fragmentary view showing a portion of the refund control wire.

In addition to the electrical connections between the coin and selector unit and the delivery device there are certain mechanical interconnections to affect the selection of merchandise and to indicate to the coin and selector unit when the delivery mechanism is off normal; that is, partially operated to deliver merchandise. These mechanical elements are automatically brought into alignment, Figs. 2 and 43, ready for operation when the door 7a is closed. When this door is closed, arms 12 and 13 which extend through an opening 161, Fig. 44, and which are in approximate alignment with grooves 12f and 13f in the coin and selector unit, Fig. 2, are guided to the bottoms of these grooves due to the slight angular pull of springs 12e and 13e shown in Fig. 43. An arm 340, Fig. 43, adapted to indicate when the delivery mechanism is off normal, is also brought into a position adjacent to an opening 109 in the coin and selector unit, Fig. 2. A selector disc 9c, Fig. 43, on a price and selector drum, Fig. 9, is aligned with the guide grooves 12f and 13f so that the arms 12 and 13 are guided into two of the guide groove 9g, Figure 2, as determined by the position of the selector disc as described later. Sufficient margins of operation are allowed so that slight deviations in their relative positions when the door is closed will not prevent the proper performance of their functions.

The delivery device shown in the drawings is intended to illustrate a typical mechanism for dispensing cigarettes or other commodities of varying prices and in this particular construction the package chutes may be varied in size to accommodate other articles. Provision for sixteen selections is shown in the coin and selector unit but only six selections are shown in the drawings of the delivery mechanism since other selections are essentially duplications of these mechanisms.

ELECTRIC CIRCUIT AND GENERAL PRINCIPLES OF OPERATION

The principal features of the machine broadly considered may be most quickly understood by reference to Figs. 1, 11, 19, 32, 34 and 48. The complete circuit operation and only the broad general principles of the mechanical operation will be described in the following paragraphs making reference to Fig. 48 and to certain mechanical elements in other figures which will then be fully described in the supporting structure. A summary of the operating cycle for various typical transactions will be given at the end of the specification.

The operation of the machine as it affects a customer will first be described briefly. The dial 15, Fig. 1, is similar in operation to a telephone dial. The customer first inserts coins in entrances 11, 11a or 11b equal to or greater than the price of the article desired as may be indicated at a window 6c; second he dials A, E or H, etc., corresponding to the article desired which causes closure of a circuit to release the delivery mechanism; third he moves the delivery wheel 202 one complete revolution causing an article to be delivered selection being made by mechanical interaction between the delivery mechanism and the dial mechanism. The ejection of the article results in the collection of the money and the restoral of all parts to normal positions.

The dial is ineffective unless at least one coin has been deposited. If coins have been deposited but not in proper amount the wheel 202 will be locked against movement and the customer presses the refund plunger 98a which causes the refund of the deposited coins and the return of all parts to normal positions.

Assume now that all parts of the machine are in normal positions which are the positions shown in the drawings. Coins deposited come to rest in the coin channels in positions shown dotted in rear view Fig. 19 and are visible through slot 22, 22a or 22b in the coin channels, Fig. 1, and through the transparent dial 15. When the dial is moved so that one of the holes A, B, etc., is brought up to the dial stop 15a it will set the price and selection drum, Fig. 9, and will, on return to normal, move upward a bar 81 rocking slightly a disc 35, provided a coin has been deposited in one or more of the coin channels, causing momentary closure of contact S. This closes a circuit from ± through solenoid 226 and contacts S, Y and V to GD operating solenoid 226 which moves a part 17, Figs. 2 and 15, out of engagement with a cam gear 245 releasing a spring pressed element 234 to close contact T. This closes a circuit from ± through motor 330 and contact T to GD operating the motor which drives a cycle control cam on cam gear 245 through about one third of its cycle at which point the perforation 230a on gear 245 engages part 17 moving the spring pressed element 234 to reopen the contact T and stop the cam gear at the one third cycle point. During this part of the operating cycle various elements on the control cam cause certain functions in sequence which, broadly considered are as follows:

*First.*—Cam 36c tends to move a series of pins 23 endwise, those that engage coins being left protruding above the surface of a plate 91, Figs. 24 and 25.

*Second.*—Cam 36d tends to move penny and nickel credit feelers to engage the protruding pins 23 and tends to move associated penny and nickel price feelers to engage the price plate 10, Fig. 32, that has been placed in operative position by the setting of the drum, Fig. 9. Depending upon the points at which the feelers are stopped, this establishes a differential, in steps of penny value, of excess penny price over penny credit as illustrated graphically in Fig. 28. At the same time it establishes a differential, in steps of nickel value, of excess nickel credit over nickel price as illustrated graphically in Fig. 29. In the latter operation five pennies are registered as one nickel credit and each dime is registered as two nickels credit as will be explained.

*Third.*—A lug 56d, Fig. 32, having been placed in position 0, 1, 2, 3 or 4, Fig. 31, by the differential established in the nickel price and credit feelers, is moved upward moving a part 308 to cause momentary closure of the delivery start contact U unless it is blocked by the particular control bar 41, 43, 44, etc. which it engages. It is the purpose of these control bars and associated parts to block this movement and prevent closure of contact U unless the proper differentials have been established in Figs. 28 and 29 and proper change coins are in the change channels when the differentials are such as to call for change.

The momentary closure of contact U completes a circuit from ± through delivery release relay 126 and contact U to GD operating relay 126 which locks through its own contact W and through contacts X and V to GD. This would be prevented if the refund plunger should be improperly operated as this would open the circuit at contact V.

With relay 126 energized the delivery wheel 202 is unlocked after a slight movement and when so unlocked a lever 122 is rocked by a pin 119 as hereinafter explained and the contacts X and Y are opened and held open until the wheel 202 has been moved through a complete revolution. This together with the mechanical interaction of a part 118 with the coin mechanism prevents any false operation in the coin control mechanism in case the delivery operation should not be completed.

The passage of a package from a storage compartment into the delivery chute causes closure of contact Z. This completes a circuit from ± through solenoid 226 and contact Z to GD. The operation of the solenoid releases the spring pressed element 234 which allows contact T to close and the motor drives the control cam through the remainder of its cycle. At the end of the cycle the spring pressed element is again moved by the perforation 230 of cam gear 245 to reopen contact T stopping the motor and the cam gear. During this part of the operating cycle various elements on the control cam cause certain functions in sequence which broadly considered are as follows:

*First.*—Penny change coins are delivered if required in accordance with the differential set up between penny price and penny credit feelers.

*Second.*—A nickel change is delivered if called for in the differential set up between nickel credit and nickel price feelers.

*Third.*—The money held in the coin channels is released and passes into the coin box.

*Fourth.*—All parts of the mechanism are restored to normal positions.

DELIVERY DEVICE

The delivery mechanism is housed in the lower part of the cabinet in the space formed by a base plate 339, a front wall 6b and a removable cover 113, Figure 34. A sloping floor 192 is also provided attached to the cabinet at its upper and lowermost edges. The floor 192 and the cover 113 may be removed to permit ready access to the mechanism for assembly or repairs.

A delivery wheel housing 338 is attached to the front wall 6b of the cabinet and a delivery wheel 202, Fig. 1, having an axle supported by a boss 139 on the housing 338 is arranged to be rotated within the housing by means of a handle 136. A drive shaft 335, Fig. 36, is supported at one end by a bearing post 334 on the housing 338 and at the other end by a bearing 333 on a plate 332, this plate being in turn attached to a bracket 331 and a lug 329 on the front wall 6b and side wall 6a respectively of the cabinet. A bevel gear 327 on one end of the shaft 335 is in mesh with bevel gear teeth 326 forming an integral part of the delivery wheel 202. A crank 324, Figure 37, on the other end of the shaft 335 is connected to one end of a link 323 by a pin 322. A pin 321 rigidly attached to the other end of the link 323 passes through a hole in one end of a link 320 and extends into a slot 317 in a guide bar 318 attached to one side of the cabinet. The other end of the link 320 is attached by a pin 316 to a rocking arm 315 the lower end of which is rigidly attached to a hollow shaft 314. An essentially similar rocking arm is rigidly attached to the hollow shaft 314 at the opposite side of the cabinet. The hollow shaft is supported at either end in such manner as to permit its rotation by means of a bolt 106 having its end turned down to fit the inside of the hollow shaft and fastened through a hole in the side of the cabinet by means of a nut 305.

A guide bar 304 having a groove 303 is attached to the side of the cabinet as shown in Figure 37 and an essentially similar guide bar is attached to the opposite side of the cabinet. A delivery bar 111 is provided having, throughout most of its length, the cross section shown in Figure 34, the vertical sections being cut away a short distance at either end adapting it to slide in the grooves 303 of the guide bars 304 provided at the opposite sides of the cabinet. A short distance from either end the front vertical section 112 of the delivery bar 111 is adapted to operate in an opening 300 in the rocking arm 315. The structure just described is such that when the delivery wheel is turned the shaft 335 is rotated and the crank 324, through the links 323 and 320, imparts a rocking motion to the rocking arm 315 and since the rocking arms at the opposite sides of the cabinet are rigidly connected to the hollow shaft 314 the delivery bar 111 is moved laterally, guided by the grooves 303, being at all times parallel to the line of the package chutes.

A delivery element 299 for each package chute A'', E'', H'', etc. is provided on the delivery bar 111 having its central portion underneath the slot 298 in the floor of the corresponding package chute. Only one such delivery element is shown in Figure 35. A tube 297, Figure 39, rigidly attached to the delivery element at its pivot point, serves to support the delivery element on supports 296, Fig. 34, on the delivery bar 111 by means of a rod 295 which extends substantially the full length of the delivery bar. A U shaped spring 294 is provided which normally holds the delivery element in normal position as shown solid in Figure 34.

A selector rack 293, Figs. 35 and 36, is provided which is a tube-like structure having a series of selection fingers A', E', H', etc. and having bearing inserts 292 in either end adapted to slide or rotate on a rod 291 which rod is rigidly attached at its ends to brackets 331 and 290 on the front wall of the cabinet. The selector rack 293 is arranged to have four rotary and four horizontal positions, and only one of the fingers A', E', or H', etc., on this rack will be in position to engage a tongue 289, Fig. 34, that is provided on the selector element 299. The rotary and horizontal positions into which the selection rack 293 is moved when the machine is operated are, by mechanical interaction, determined by the length of the guide grooves 9g, Fig. 2, that are placed into operative position in alignment with the guide grooves 12f and 13f.

When the delivery bar 111 is moved toward the front the finger A', E' or H' etc. that has been brought into operative position engages the tongue 289 of the selector element associated with the selected article. This causes the selector element to be rocked on the pivot rod 295 over the dead center relative to the spring 294 raising the face 288 of the delivery element through the slot 298 in the base plate 339 in position to engage and eject a package from the corresponding package chute into the passage between plates 113 and 192 to the delivery opening 6d when the delivery bar is moved toward the rear. The delivery element is restored to normal position by engagement of the tongue 289 with a barrier 287, Fig. 34, attached to base plate 339 when the delivery bar is near its rear position.

Figure 2 shows the arrangement of the slots 9g in the selector guide plate 9f for 16 selections. The circles designated (1), (2), (3) and (4) indicate the position or step to which the rotary control arm 12, Fig. 43, will, when moved downward, rotate the selection rack 293, and the horizontal position or step in which the horizontal control arm 13, Fig. 44, will cause the selection rack to be placed. The mechanical arrangement for positioning the selector rack 293 is as follows:

A frame 286, Figure 43, is provided in the channel 345 which frame is attached to cross plates 282 and 285 joining the front sides of two of the wall plates 350. Selector bars 12d and 13d are supported top and bottom by guides 278 and 279 on the frame 286 the guide slots in the upper guide 278 being such as to permit some lateral movement of the selector bars. Tension springs 12e and 13e are attached to an ear 277 on the frame 286 and to the bars 12d and 13d at such angle as to tend to hold these bars upward and toward the front. This tends to bring the arms 12 and 13 into alignment in the slots 12f and 13f when the door 7a is closed as has been explained.

A rotary selection lever 12a, Figure 34, having a tube 260 rigidly attached through its pivot point is arranged to be rocked on a pivot shaft 259 which shaft is supported by ears 256 and 257 on a support plate 253, Fig. 35, this plate in turn being attached to the housing 338 at one end and to the base plate 339 at its other end. An opening 12g is provided in one end of the lever 12a adapted to fit over an arm 172 on the selector rack 293, the arm 172 being sufficiently broad that it will not pass out of engagement with the lever 12a in the full horizontal movement of the rack 293. A wire 12c is attached to the opposite end of the lever 12a, Fig. 34, and the upper end of this wire is attached to the selector bar 12d, Fig. 43. The normal position of the positioning arm 172 is shown solid in Figure 40 and the operated positions are shown dotted.

A horizontal selection lever 13a, Fig. 35, is pivotally supported on the same pivot shaft 259 which supports the rotary selection lever 12a. A wire 13c is attached to one end of the selection lever 13a and the upper end of this wire is attached to the selector bar 13d. An arm 13g on the horizontal selection lever 13a extends through an opening 148 in a stop lever 149, Figure 36. The stop lever 149 is supported at its lower end by a pivot 147 on the housing 338 and at its upper end engages a collar 146 on the selector rack 293. A spring 145 is provided having one end attached to a lug 144 on the selector rack 293 and having its other end attached to the bracket 331 on the cabinet wall 6b. The spring 145 tends to move the selector rack 293 and in turn the upper part of the stop lever 149 toward the left as seen in Figure 36. However, a pin 143 on the stop lever 149 extends through an opening 142 in the housing 338 and engages a cam 141 on the delivery wheel 202 holding the stop lever 149 and the selector rack 293 in the positions shown in Figure 36.

A selector control lever 164 is provided which is adapted to rotate on a pivot shaft 163 supported at either end by ears on the plate 253. An arm 160 on the control lever 164 contains a pin 159 which is adapted to engage a cam 158 on the bevel gear 327, and another curved arm 157 extending through a hole 156 in the plate 253 engages the rotary and horizontal selection levers 12a and 13a respectively. The normal position of the cam 158 is such that the lever 164 is held in the position shown in Figure 34 holding also the levers 12a and 13a in the position shown in this figure against the tension of springs 12b and 13b which are stronger than the corresponding opposing springs 12e and 13e.

The bevel gear 327 is meshed with the bevel teeth 326 on the delivery wheel 202 in the ratio of 1:1 and therefore rotates with the delivery wheel. The shape of the cam 158 in engagement with the pin 159 is such that as the delivery wheel is rotated approximately 60°, starting at normal position, the lever 164 is freed to move far enough to permit the following action.

1. The tension spring 12b rocks the rotary selection lever 12a and pulls the wire 12c and the selection bar 12d downward against the tension of the weaker spring 12e until the arm 12 is stopped by the stop point (1), (2), (3) or (4) on the selection guide plate 9f. The action of the lever 12a on the positioning arm 172 attached to the selection rack 293 rotates the selection rack to a rotary position corresponding to the stop point (1), (2), (3) or (4) on the guide plate 9f.

2. The tension spring 13b rocks the horizontal selection lever 13a and pulls the wire 13c and the selection bar 13d downward against the tension of the weaker spring 13e until the arm 13 is stopped by the stop point (1), (2), (3) or (4) on the selection guide plate 9f. The arm 13g on the lever 13a is thereby moved in line with a corresponding stop point 1', 2', 3' or 4' in the stop lever 149.

The shape of the cam 141 in engagement with the pin 143 on the stop lever 149 is such that on a continued movement of the delivery wheel after the above action takes place the stop lever 149 will be freed to move under the action of the spring 145, the selection rack 293, and the collar 146 until the stop point 1', 2', 3' or 4' engages the arm 13g on the horizontal selection lever 13a. The selection rack will thereby be brought into the horizontal position corresponding to the stop point (1), (2), (3) or (4) on the selection guide plate 9f.

The relation of (a) the stop points (1), (2), (3) or (4), Figure 2, for arms 12 and 13 as they are moved over the selector guide plate 9f and (b) the corresponding horizontal and rotary positions of an associated selection rack 293 arranged for sixteen selections is shown by the following table. The normal positions 4r of the selection pins M' and P' are shown solid in Figures 41 and 42 respectively and the operated positions are shown dotted.

| Selection | Stop Point of Horizontal Arm 13 | Horizontal Position of Selection Rack | Stop Point of Rotary Arm 12 | Rotary Position of Selection Rack | Selection Finger brought into operative Position |
|---|---|---|---|---|---|
| A | (1) | 1 | (1) | 1 | A' |
| B | (1) | 1 | (2) | 2 | B' |
| C | (2) | 2 | (2) | 2 | C' |
| D | (2) | 2 | (1) | 1 | D' |
| E | (1) | 1 | (3) | 3 | E' |
| F | (3) | 3 | (3) | 3 | F' |
| G | (3) | 3 | (2) | 2 | G' |
| H | (2) | 2 | (3) | 3 | H' |
| I | (3) | 3 | (1) | 1 | I' |
| J | (1) | 1 | (4) | 4 | J' |
| K | (4) | 4 | (4) | 4 | K' |
| L | (4) | 4 | (2) | 2 | L' |
| M | (2) | 2 | (4) | 4 | M' |
| N | (4) | 4 | (3) | 3 | N' |
| O | (3) | 3 | (4) | 4 | O' |
| P | (4) | 4 | (1) | 1 | P' |

The drawings covering the delivery mechanism show only six selections A, E, H, I, M and P which fully illustrate the selection mechanism. It is to be understood that package chutes B'', C'', D'', etc. and corresponding delivery elements 299 may be added up to a total of sixteen and the selector rack 293 extended to provide the additional selection fingers B', C', D', etc. It is to be understood also that more than 16 selections can be readily provided by increasing the size of the selector guide plate 9f and providing a larger number of horizontal and rotary steps on this plate and on the selector rack mechanism.

A pawl 135, pivoted at 134 on housing 338, Fig. 36, is adapted to engage ratchet teeth 133 in the delivery wheel 202 preventing appreciable counter-clockwise movement of the wheel as viewed from the front of the machine. However, it permits a slight clockwise movement before the pawl passes a tooth. An L-shaped latch 132 having an end extending into a recess 128 in the periphery of the wheel 202 and pivoted at the other end on a link 131 may be moved a short distance by rotation of the wheel 202 against a stop 130 which normally prevents further rotation of the wheel. The wheel is normally held in the position shown in the drawing by a tension spring 129 which also tends to hold the latch in the recess 128. A release arm 127 attached to the latch 132 extends to a point adjacent to a stop arm 125 on the armature 124 of a relay 126 in such position that the release arm 127 normally clears the stop arm. When the relay 126 is energized, the arm 125 is moved into the normal path of the end of the release arm 127 so that when the wheel 202 is rotated the release arm 127 engages the stop arm 125 causing the latch 132 to be rocked on pivot 123, thus moving the latch 132 out of the recess 128 permitting the further rotation of the wheel. When the free end of this latch passes out of the recess 128, the latch is returned by the spring 129 but the free end of the latch is in a slightly lower position following a recess 137 in housing 338 due to its engagement with the periphery of the wheel 202.

An off-normal lever 122, Fig. 36, is provided arranged to be rocked on a pivot pin 121 attached to the housing 338. A pin 119 on the latch 132 is positioned so that in the upper position of the latch 132 it will clear the vertical arm of the off-normal lever 122, but when the latch 132 is restored by spring 129 in its lower position it will engage the vertical arm of the lever 132, rocking this lever. Off-normal contacts X and Y are provided adjacent to a horizontal arm of the lever 132 in such position that these contacts are opened by the rocking of this lever. The movement of the off-normal lever 132 is mechanically transmitted to the coin and selector unit by means of a rod 118, a rocking bar 117, Fig. 34, a wire 167 and a lever 276, Fig. 43, and is for the purpose of preventing false operation of the coin and selector mechanism when the delivery mechanism is partially operated. The lever 276, supported by a pivot 275, is normally held in the position shown in Figure 43 by a spring 265 which holds the arm 340 on lever 276 out of engagement with the coin and selector unit mechanism. The tension of the spring 265 on the wire 167 holds the bar 117, which is pivoted in a slot in a lug 117a, in the position shown in Figure 34 and this in turn holds the rod 118 down and together with the tension of the off-normal contact spring tends to hold the off-normal lever 122 in the position shown in Figure 36. The spring 129 is strong enough to overcome the tension of both the off-normal contact spring and the spring 265 when the off-normal lever is operated by the pin 119 as explained above. The arrangement is such that the off-normal mechanism operates as explained whenever the stop latch 132 is moved out of the recess 128, the wheel 202 being then free to be rotated one complete turn in clockwise direction. At the end of one revolution the end of the stop latch 132 will again enter the recess 128 preventing further movement since the relay 126 will have been released by the opening of the off-normal contact X.

A gate 29, Fig. 35, is pivoted at either end on ears 29a and 29b attached to a rear wall of the cabinet, the free side of the gate extending by its weight across the path of packages ejected through any of the series of openings 353. A collect contact Z is provided which is normally held open by an arm 29c, Fig. 34, on the gate 29 engaging an insulating lug 29d on one of the springs of the contact. The ejection of a package causes the deflection of the gate 29 and the resulting movement of the arm 29c allows the contact Z to close as a signal to the selector unit that a package has been delivered as will be explained later.

COIN AND SELECTOR UNIT

For the purpose of description the coin and selector unit may be considered as made up essentially of certain mechanical devices or features and these will now be described separately.

Price and selector drum

The assembly shown in Figure 9 will be referred to as the price and selector drum. This comprises a hub member 9 to which are rigidly attached a selector ratchet wheel 92 a price selector disc 9a having a notched cylindrical edge, a disked spring member 9b and a selector disc 9c having a cylindrical edge. Slots 9d are provided in the side of the ratchet wheel 92 which are in alignment with corresponding notches 9e in the disc 9a. A series of price plates 10, Fig. 8, is provided, one plate for each brand of merchandise to be vended, which price plates are adapted to be placed in the slots 9d and corresponding notches 9e and held in place by the edge of the disked spring 9b engaging a notch 10d in the price plate. A guide plate 9f is attached to the selector disc 9c comprising guide elements a, b, c, etc., as shown in Figure 2. The slots 9g between the guide elements a, b, c, etc., extend to various distances from the center of the selector disc as indicated by the dotted circles (1), (2) and (3).

A spring wire 114, Fig. 9, which is L-shaped at one end is formed into a partial ring at the opposite end which fits loosely in an annular groove 9h in the hub member 9. A torsion spring 116 is attached to the hub at one end and hooks over the spring 114 at the other end, the tension of the spring 116 being such as to normally hold a stop lug 9i on the selector disc 9c against the spring 114. The price and selector drum is adapted to be placed on a shaft 97, Figure 11, and at the same time the L-shaped end of the spring 114 is pressed into a channel formed by a piece 118, Figure 2. A slight hook on the end of spring 114 creates sufficient tension to hold it in place and the spring 116 together with the spring 114 hold the price and selector drum in normal position, the structure being such as to permit the ready removal and reinsertion of the drum for changing the price plates 10.

Coin channel mechanism and dial

As shown in Figure 18, coin channels 31, 31a and 31b, adapted to receive pennies, nickels and dimes respectively, are formed by castings 34 and 34a and an insert 34b between these castings. These parts are attached to the door 7a. A coin stop bar 39, Fig. 19, having a tube 40 rigidly attached to it is slideably supported on a pin 40a attached to the casting 34a. Ears 39a, 39b and 39c on the coin stop bar 39 normally extend through holes in the casting 34a and into the coin channels 31, 31a and 31b respectively to arrest coins inserted therein. Extending along the bottom of each channel is a bar 49, Fig. 11, having a turned edge which extends over the flange of an L-shaped supporting bar 49e which holds the bar 49 in place but permits a rocking motion. The bar 49 is normally at such angle that the bottom of a coin tends to slide toward the front so that when a coin comes to rest its upper edge rests against the casting 34a and its central part rests against a ridge 120 provided along the front of the coin channel. The purpose of this structure is to hold each coin in such position that succeeding coins inserted in a channel are arrested by the last coin inserted without overlapping. An arm 49a, Fig. 19, on the lowermost end of the bar 49 extends through a hole 49d in the casting 34a. A notch in the edge of the arm 49a engages an edge on the coin stop bar 39. The structure is such that when the coin stop bar is moved toward the rear, sliding on the pin 40a, the coins will be released by the removal of the ears 39a, 39b, and 39c from the coin channels and each of the bars 49 will be rocked in such position as to make the bottom of the coin channel approximately horizontal from front to rear permitting free movement of the coins out of the channel.

A coin refund channel 50, Fig. 19, is provided in the casting 34a adapted to pass any spurious coins that may be ejected by the coin selectors. There are also openings 51, 51a and 51b from the channels 31, 31a, and 31b respectively into this coin refund channel. A beveled edge 54 is provided on the lower side of each coin channel at the corresponding opening such that any coin inserted in excess of the capacity of a channel, namely 5 pennies, 4 nickels or 2 dimes, will engage the uppermost coin in the channel and be deflected by the beveled edge into the refund channel.

A dial 15, Fig. 11, made of transparent material, is supported on a hub 15b attached to a shaft 97 which is adapted to rotate in a bushing 100 pressed into a boss 101 in the casting 34a. A torsion spring 55 engages the hub 15b at one end and a pin 55a on casting 34 at its other end holding the dial in normal position with a boss 15c, Figure 19, on the dial in engagement with a stop screw 181 extending through the casting 34, Fig. 6. Slots 22, 22a and 22b, Figure 1, are provided in the casting 34 through which the upper parts of coins inserted can be seen back of the transparent dial. The dial contains finger holes with designations A, B, C, etc., in its outer rim which rim is thicker than the central portion of the dial and also contains a notch 15d in the inner edge of this rim.

A roller 60, Fig. 19, adapted to rotate on a shaft 60a engages the outer edge of the dial. The shaft 60a is rigidly attached to a link 60b pivoted to the casting 34 by a pin 60c which is also rigidly attached to the link 60b. Fan blades 60d are attached to the roller 60. The angle of the link 60b is such that when the dial is moved from its normal position the pressure of the roller on the dial is decreased but when the dial is returned to normal by the spring 55 the pressure of the roller on the dial is increased and the rotation of the fan tends to retard the return movement of the dial.

A dial lever 65, Fig. 19, is pivoted on a pivot screw 65b attached to the stop screw 181. A pin 65a on the dial lever 65 extends through a slot 105 in the casting 34 into the notch 15d in the dial. A link 69 is pivoted to the opposite end of the dial lever the upper end of the link containing a pin 69a adapted to slide in an opening 82c, Fig. 21A, in a vertical plate 82b on a guide bracket 82 that is in turn attached to the casting 34. A coin feeler bar 72 is provided having arms that are loosely attached to the casting 34a by screws or the like. Ears 72a, 72b and 72c on the feeler bar 72 are in alignment with corresponding holes in the casting 34a. A slide bar 81 is supported at its upper end in a slot 82a, Fig. 21, in the guide bracket 82 adapted to permit some horizontal movement of the upper end of the bar 81. A bent rod 81a attached to the lower end of the bar 81 passes through a hole in an ear 72d on the feeler bar 72. A dial off-normal lever 86 pivoted by a pin 86b to a boss on the casting 34a is connected at its upper end by a link 88 to the upper end of the slide bar 81. An arm 86a on the lower end of the lever 86 extends through a slot 90, Fig. 22, in a plate 91 of the price and credit control device to be described in detail later where it is engaged by a pin 92a on the selection ratchet wheel 92, Figures 9 and 22. A tension spring 88a is attached to the link 88 in such angular position that it tends to hold the slide bar 81 upward with its upper end toward the left in Figure 19. However, when the ratchet wheel 92 is in normal position the ratchet wheel pin 92a holds the off-normal lever 86 and in turn the upper end of the slide bar 81 in the position shown in Figure 19 against the tension of the spring 88a. The bend of the rod 81a attached to the slide bar 81 is such that with the slide bar in its upper position and the rod 81a engaging a boss 34c on the casting 34a, Figure 12, the ears on the feeler bar 72 will be held out of the coin channels.

When the dial is moved off-normal, the pin 65a on the dial lever 65 is engaged by the edge of the notch 15d in the dial rocking the dial lever which pulls the link 69 downward and the pin 69a on the upper end of this link engages a hook 81c on the slide bar 81 pulling this bar downward. If the dial is moved far enough, the dial lever 65 will pass over dead center. At the same time the ratchet wheel 92 is moved off-normal by the movement of the dial as will be explained later moving a pin 92a away from the arm 86a on lever 86 and the dial off-normal lever 86 is rocked slightly counter-clockwise, as seen in Figure 19, by the action of the spring 88a. The opening 82c which serves as a lateral guide for the upper end of the link 69 is wider at the bottom than at the top, Figure 21A, permitting the upper end of the link 69 to move to the left with the slide bar 81 when in its lowermost position. When the dial returns to normal, the pin 65a is engaged by the opposite side of the notch 15d causing the lever 65 to be moved back over dead center and the action of the spring 88a pulls the slide bar 81 upward causing momentary closure of a contact S as follows:

A disc 35, Figure 2, is arranged to rotate on a shaft 35a extending into a bearing attached to plate 91. A pin 35b on the disc 35 extends through a slot 153 in plate 91, Figure 25, and into an opening in the slide bar 81 in the position shown dotted in Figure 2. A spring 154 associated with a start contact S is extended to engage an insulator pin 35c on the disc 35. The spring 154 tends to hold the disc 35 in normal position shown in Figure 2. When the slide bar 81 moves upward upon the return movement of the dial 15, as explained, the hook 81b in the bar 81 will, if the dial has been moved far enough to cause the ratchet wheel 92 to become locked off normal, engage the pin 35b and rock the disc 35 allowing start contact S to close. As the bar 81 continues its upward movement the hook 81b will slip off of the pin 35b and the spring 154 will cause the disc 35 to return to normal and open the contact S. This action gives a slight time interval of closure of the contact. If the dial is not moved far enough to cause the ratchet wheel 92 to become locked off normal, the ratchet wheel and consequently the dial off-normal lever 86 will be returned to normal position by spring 88a along with the dial, and the hook 81b will not engage the pin 35b therefore the contact S will not be operated.

Referring to Figure 33, the closure of contact S will close a circuit from GD through contacts Y and V to a solenoid 226 which is a part of the cycle control and change mechanism. As will be described later, the operation of the solenoid 226 will cause a cam assembly 36 which contains cams 36a, 36b, 36c, 36d and 36e to be rotated approximately one-third of one revolution.

A drum operating link 84, Figure 22, having a sloping lip 84b is provided which is pivoted by pivots 84a to a collar 97a attached to the shaft 97. When the dial is moved off-normal and the slide bar 81, Fig. 12, is moved downward the sloping portion of the rod 81a, attached to the slide bar, moving through the hole in ear 72d on the coin feeler bar 72 tends to rock the feeler bar so that the ears 72a, 72b and 72c enter the coin channels. If, however, a coin is held by one of the ears on the stop bar 39 in any channel, one or more of the ears on the feeler bar 72 will engage a coin preventing the rocking of the feeler bar. As a result, the lower end of the slide bar 81 will be moved toward the rear. A U-shaped wire 198 is provided with one leg extended through a bushing 199 on the plate 91 to engage the slide bar 81, Figure 12, and having its other leg extending into a slot 91f in the plate 91, Figure 22. A tension spring 201, is provided having one end attached to the U-shaped wire and the other end connected to an attachment on the plate 91 at such angle as to hold the wire 198 in the normal position shown in the drawings. The rearward movement of the lower end of the slide bar 81 moves the wire 198 against the tension of the spring 201 into the path of a sloping lip 84b on the lever 84 which lever being pivoted on the collar 97a attached to the shaft 97 is rotating with the dial. The wire 198 engaging the lip 84b rocks the lever 84 so that the end of the lip engages the edge of a hole 92b, Figure 7, provided in the selection ratchet wheel 92 rotating this wheel along with the dial to the point where the finger in the finger hole corresponding to the selection desired engages the stop 15a.

A pawl 205 associated with the selection ratchet wheel 92 is positioned so that the price and selection drum will be locked in such position that the price plate 10 corresponding to the selected article will be in alignment with price bars 206 and 56 and a guide element a, b, c, etc., Figure 2, corresponding to the selection made will be at the top aligned midway between the guide grooves 12f and 13f.

*Price and credit control device*

A supporting frame for the credit control device comprises a base plate 91, a top plate 91d and arms 91a and 91b, Figs. 18 and 25. Holes 91g and 91h in the plate 91 and holes 91i and 91j on lugs 91k and 91l attached to the plate 91 are in alignment with threaded holes 19, 19a, 19b and 19c in the casting 34a to which the control device is attached by screws.

A pin 23, Figure 24, is provided in the approximate center of each position in which a coin may come to rest in the coin channels, Fig. 19. One end of the pin 23 is slideably supported in a hole in the plate 91 and the other end in a hole in the casting 34a. A pin control plate 24, Figure 25, is provided having a hole in its central part adapted to slide laterally on the bushing 100 and having a hole loosely fitting over each of the pins 23. A collar 23a, Fig. 24, is provided on each pin and also a flat spring 23b is provided, one end of which is attached to the pin control plate 24 and the other end rests on the collar 23a.

A rocking bar 33, Fig. 23, is provided which is pivoted top and bottom by pivots 32 and 32a respectively to suitable supports on the plate 91. An arm 33a at the top and an arm 33b at the bottom of the rocking bar 33 engage lugs 24c and 24d on the pin control plate 24. A spring 106 attached at one end to the arm 33b and at its other end to an ear on the plate 91, Figure 23, tends to hold the rocking bar 33 in such position that the arms 33a and 33b press on the pin control plate 24 which plate engaging the collars 23a on the pins 23 holds the ends of the pins normally extending above the surface of the plate 91 and the opposite ends out of the coin channels.

An arm 24a on the pin control plate 24 extends through a hole in the plate 91 and a lug 24b, Fig. 6, is provided on the end of this arm which slideably engages in a slot in the top plate 91d so that as the cam 36c rotates rocking the bar 33 the plate 24 is moved away from the plate 91 but is constrained to move in a plane parallel to plate 91. This tends to move all of the pins 23 into the coin channels. Any pin that does not engage a coin in the channel will be moved by its spring 23b so that it will not protrude above the surface of the plate 91 but any pin that does engage a coin in the coin channel will be stopped, its corresponding spring 23b will be bent and the pin 23 will remain extended above the surface of the plate 91 corresponding to the positions in which coins are retained in the coin channels.

Figure 14:
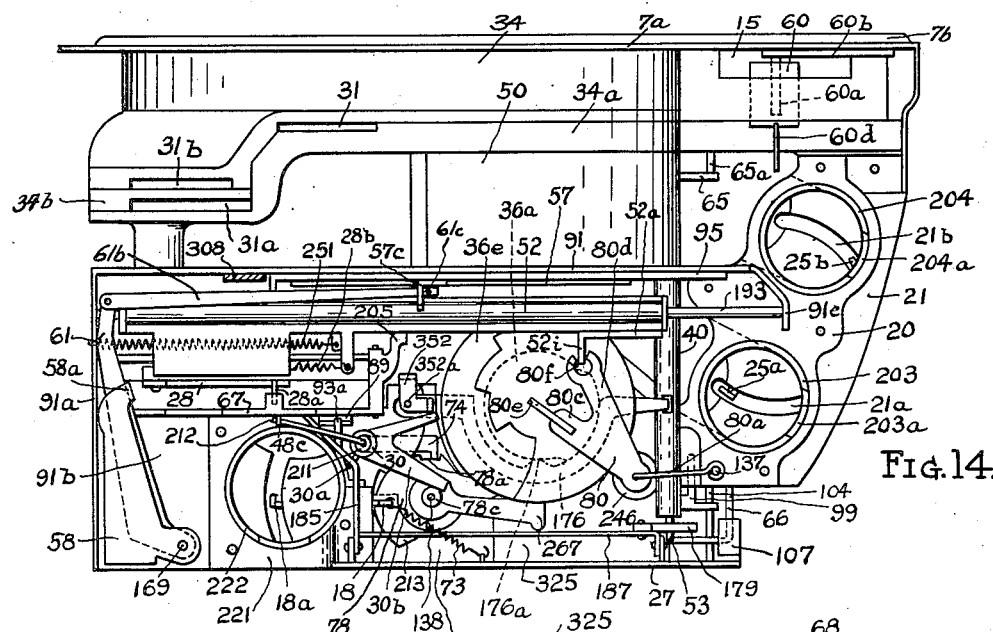
Figure 14 is a top view of the coin and selector unit with the top plate removed.
Figure 15:
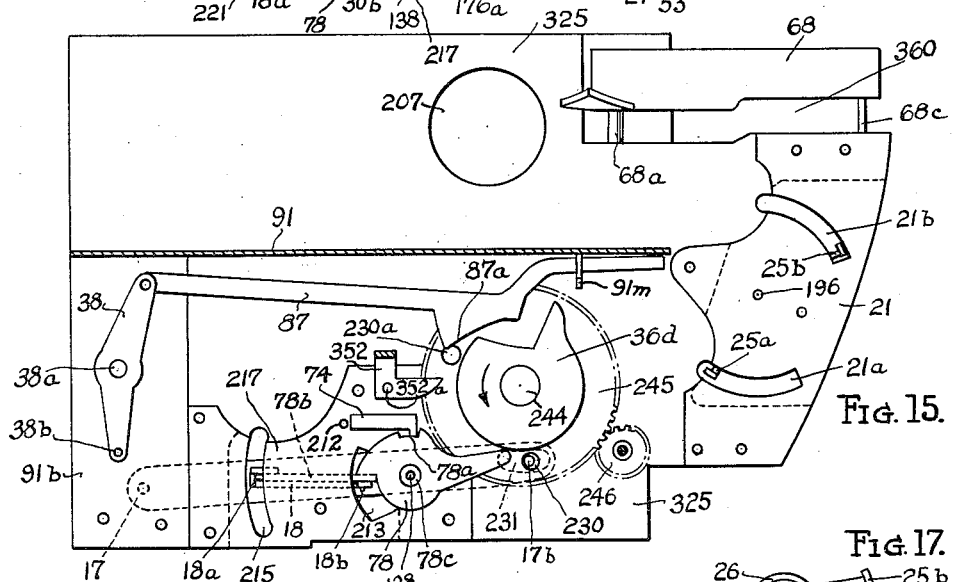
Figure 15 is a top view of the base casting showing also certain parts that are mounted directly on it.

A sweep bar 87, Figure 15, is pivoted at one end to a lever 38 and is supported at its other end in a guide 91m in which it may slide. The lever 38 is pivoted on a post 38a on the frame arm 91b and contains a pin 38b which engages in a slot in the lower arm of a sweep operate lever 58, Figs. 2 and 14. The sweep operate lever 58 is provided with a lug 58a on its upper arm, Fig. 18, and a lug 58b on its lower arm and is pivoted on a rod 169 attached to the top plate 91d and to the lower frame arm 91b. Sweep arms 61 and 62 attached to tubes 61a and 61b are also pivoted on the rod 169 and are retained in normal position against the lugs 58a and 58b respectively by torsion springs 177 and 178 one end of which engages the sweep operate lever 58 and the other end engaging the respective sweep arm.

A torsion spring 170, Fig. 18, attached at one end to the frame arm 91b and at its other end to the sweep operate lever 58, tends to retain the sweep operate lever 58, the lever 38 and the bar 87, Fig. 15, in normal position as determined by the engagement of the lugs 58a and 58b with the sweep arms 61 and 62. Rotation of the cam 36d moves the bar 87 to the left in Figure 15 rocking the lever 38, the sweep operate lever 58 and consequently the sweep arms 61 and 62. After operation of these parts their return to normal by spring 170 is retarded slightly by the engagement of the lug 87a on the bar 87 against the point of the cam 36d as the cam rotates.

Figure 32 is a fragmentary perspective view showing the relation of various parts involved in price and credit control. Briefly, the movement of the sweep arm 61, indicated by an arrow 61, causes a differential to be set up between penny price and penny credit by the position set up by the latch 28 in the rack 52e, shown graphically in Figure 28, and the sweep arm 62, also indicated by an arrow 62, causes a differential to be set up between five cent unit price and five cent unit credit by the position set up by the latch bar 56c in the rack 64b, shown graphically in Figure 29. The unit distance between the teeth on the rack 52e is to be considered as representing a penny value and the unit distance between the teeth on the rack 64b, which may be the same as that on rack 52e, is to be considered as representing a five cent unit of value. The price and credit control mechanism will now be described in detail.

A penny check plate 95 and a penny credit plate 57, Figure 22, are slideably supported on base plate 91 by means of shoulder rivets in slots 57a. The slots 57a in the penny credit plate 57 are of such length as to permit the plate to slide five steps from normal position and the corresponding slots in the penny check plate 95 are of such length as to permit it to slide one step. Slots 57b of various lengths are provided in the plate 57 through which the coin feeler pins 23 may extend. One end of a link 61b is pivoted on the end of the sweep arm 61. Its other end extends through a slot in a lug 57c on the penny credit plate 57 and a pin 61c extends through its end beyond the lug 57c. The pin 61c serves to move the penny credit plate 57 to normal position whenever the sweep arm 61 is moved to normal position. An L-shaped spring 61d is attached at one end to the plate 91d and its other end engages the link 61b normally holding the end of this link in a slot 57d in the penny credit plate 57. Under this condition the movement of the sweep arm 61 will, by means of the link 61b, tend to move the plate 57 to the right in Figure 22 and will also directly engage a penny credit bar 52 which is adapted to slide on a rod 193 supported at one end by an ear 91c on the plate 91 and at its other end by the arm 91a on plate 91. There is also a lug 52b attached to an arm 52a on the credit bar 52 having a notch 52c engaging the edge of a slot 91e in the plate 91 which guides the lowermost side of the credit bar.

The penny credit plate 57 and likewise the penny credit bar 52 will be moved a distance determined by coin feeler pins 23 that may be extended into the slots 57b. If no pennies are in the coin channel 31, no penny feeler pin 23 will be extended and the plate 57 will be moved through its limit of movement which is such as to register no pennies credit. If one penny is in the channel the lowermost penny feeler pin 23 will stop the plate 57 a unit distance from its limit of movement corresponding to unit of distance on the price plate 10 representing a penny value, thus establishing a penny credit. Likewise, if two, three or four pennies are in the coin channel, the penny feeler pin 23 corresponding to the uppermost penny will stop the plate 57 to register two, three, or four pennies credit as determined by the length of the respective slot 57b. The torsion spring 170, Fig. 2, is stronger than either or both of the torsion springs 177 or 178 so that when either or both of the sweep arms are stopped by a credit condition as will be explained the sweep operating lever 58 will be driven through its full movement by the torsion spring 170 under control of the cam 36d.

If five pennies are in the coin channel, the uppermost penny feeler pin 23 will be extended and the end of this pin in engagement with the link 16b will have the end of this link deflected against the tension of the spring 61d so that the end of the link 16b will not engage the edge of the hole 57d to move the penny credit plate 57 and under this condition the sweep arm 61 will move the penny credit bar 52 through its limit of movement which registers no pennies credit. This value will be transferred as one step on the nickel credit feelers by a lever 83, Figs. 25 and 30, as will be explained.

A penny change check lever 319, Fig. 22, is pivoted on an arm 95b on the penny check plate 95 extending through a notch 269 in the base plate 91. The lower end of the lever 319 extends adjacent to a slot 204b in the penny coin tube 204, Fig. 6, at such height that it may engage a coin if there are two or more pennies in the tube. The lever 319 is adapted to be engaged by the lug 52b of the penny credit bar 52 that extends through the slot 91e in the base plate 91. A lug 95c is provided on the plate 95, Fig. 30, which in normal position is in alignment with the arm 46a on the control bar 46, Fig. 31, described later under delivery control mechanism. A tongue 52d is provided on the penny credit bar 52, Fig. 30, adapted to engage the lug 95c to restore or retain the plate 95 in normal position when the bar 52 is in normal position. This structure is such that when the credit bar 52 is moved by the sweep lever 61 the lug 52b, Fig. 22, will engage the lever 319 which is made of spring wire and if there are at least two pennies in the tube 204 and there are no pennies in the coin channel 31 the penny check plate 95 will be moved so that the lug 95c will be out of alignment with the arm 46a permitting its operation. Assuming that at least as many penny change coins are placed in the tube 203 as in the tube 204 this will insure that the maximum number of pennies change, namely four, that may be required for any transaction are in the change tubes.

The conditions for the delivery of penny change are:

1. The differential set up as indicated by Fig. 28 is such as to set the mechanism for the delivery of penny change.

2. There are enough pennies in the change channels. Under this condition the penny change check lever 319 tends to move the penny check plate 95.

3. There are no pennies in the penny coin channel 31, Fig. 19. Under this condition the plate 95 will not engage a pin 23 and therefore can be moved by the lever 319.

When the conditions for delivering penny change are met and the plate 95 is moved as described, this will permit the lug 46b on the arm 46a to be moved upward to close the delivery contact U. If either of the above conditions 2 or 3 is not met the plate 95 will not be moved when the lug 52d engages the spring part 319 and the arm 46a, which is adapted to be moved upward under conditions requiring penny change, will engage the lug 95c preventing closure of contact U.

On the price plate 10, Figs. 8 and 32, the number of unit distances between the edge 10a and a line 10c representing zero value is to be considered as representing pennies value; a unit distance being the same as the distance between teeth on the rack 52c. The number of unit distances between the edge 10b and the line 10c is to be considered as representing the number of five cent units of value, a unit distance being the same as that between teeth in the rack 64b. In the particular structure shown in the drawings, there may be four unit distances on a price plate 10 for pennies or a total of four pennies of value and four unit distances for five cent unit value or a total of 20 cents of value.

A guide block 63, Figures 30 and 31, which contains a series of guide grooves for various control bars, and may be made of molded plastic, is attached to the base plate 91. The lower side of this block is attached to a support 59 which in turn is attached to the base plate 91 at the legs 59a and 59b. Attached also to the guide block 63 is a series of guide blocks or plates 218, 219 and 220 which form guide channels for a one cent price bar 206 and a five cent price bar 56, Figures 18 and 32. A bar 56a attached to the lower side of the five cent price bar 56 is adapted to slide in a groove in the guide block 219. A latch bar 56c, adapted to slide vertically in a channel in the price bar 56, is provided with a lug 56d which extends through a channel in the plate 218 into a channel 63a in the guide block 63; Figs. 18 and 31. A spring 56b attached at one end to the price bar 56 exerts tension downward on the latch bar 56c so that the lug 56d on the price bar normally rides on the support 59.

A latch plate 64, Figure 32, having a rack 64b adapted to engage the latch bar 56c is supported along one side by a guide rod 227 on which it may rock or slide. Guide rods 227 and 223 are attached at either end to the support 59. A groove 64a is provided at the free side of the latch plate 64 adapted to receive a turned edge 67a on a release plate 67, Fig. 22, which plate is in turn attached to guide plate 220 by shoulder rivets 67b and 67c in grooves 67d and 67e permitting some vertical movement of the release plate. A five cent sweep plate 70 having support arms 70a and 70b is adapted to slide on the guide rod 227 which passes through holes in the upper sides of the support arms. The sweep plate 70 is also guided by the guide rod 228 by engagement with a notch 70c in the support arm 70a. The latch plate 64 is retained on the guide rod 227 between the support arms 70a and 70b of the sweep plate. A coil spring 240 having one end attached to the latch plate 64 and the other end attached to the five cent price bar 56 is tensioned so that it tends to hold the price bar 56 to the right in engagement with the first tooth of the rack 64b on the latch plate 64, as seen in Figure 32, and also tends to move the free ends of the latch plate 64 upward. The end of the sweep arm 62 extends through a hole 70d in the sweep plate 70, Fig. 22.

A drive bar 76, Figs. 22 and 32, is pivoted at one end to the sweep plate 70. A dime credit plate 75 pivoted on a pivot 75c attached to the base plate 91, Figure 22, is provided with a lug 75a adapted to support the free end of the drive bar 76. A pin 76a on the drive bar is adapted to engage an arm 75b on the dime credit plate 75, and since the spring 170 tends to hold the sweep arm 62 in normal position as has been explained it holds the sweep plate 70 to the left as seen in Figure 22 and consequently the pin 76a holds the dime credit plate in normal position as shown.

A five penny credit plate 94a and a nickel credit plate 94 are supported at one end by a shoulder rivet 94b, extending through slots 94c in both plates and they are supported at the other end in a guide channel in the guide block 63 so that the plates 94a and 94 can slide horizontally. A step plate 94d adapted to transfer dime credit to nickel units of credit is attached to the five penny credit plate 94a and a cover plate 94e is in turn attached to the step plate. The end of the drive bar 76 extends just below the step plate in a space between the five penny credit plate 94a and the cover plate 94e. A five penny credit bar 77, Fig. 30, is adapted to slide in a vertical channel in the nickel credit plate 94 and is provided with a lug 77a which extends through a hole 258 in the five-penny credit plate 94a. A five-penny credit lever 83, Figures 25 and 30, adapted to transfer five penny credit to a nickel unit of credit, is pivoted on the base plate 91. A pin 83a on the lever 83 extends through a slot 262 in the base plate adapted to engage in a V-shaped opening in the credit bar 77. A pin 83b on the lever 83 extends through a slot 264 in the base plate 91 and is adapted to engage in a notch 67e in the penny credit plate 57.

When the sweep plate 70 and drive bar 76 are moved to the right in Figure 22, by the sweep arm 62 the plate 70 will be stopped a number of steps from its farthest point of movement corresponding to the five cent units of value of the coins in the channels due to the action of the mechanism just described upon the coin feeler pins 23 that are extending above the surface of the base plate 91. As the drive bar 76 is moved toward the right its weight and some friction on the lug 75a on the dime credit plate 75 will tend to rock this plate. If two dimes are in the coin channel the plate 75 can be rocked only slightly, due to its engagement with the upper pin 23 associated with the dime channel, and the bar 76 will be held up into engagement with the uppermost step of the step plate 94d. If one dime is in the channel, the plate 75 will be rocked into such position as to allow the bar 76 to engage the middle step of the step plate 94d. If no dime is in the coin channel, the plate 75 will be rocked so that the bar 76 will engage the lowermost step of the step plate 94d.

If five pennies are in the coin channel, the penny credit plate 57 will not be moved by the operation of the sweep arm 61 as has been explained; therefore, the five-penny credit bar will remain in the normal position shown in the drawings, the lever 83 will not be rocked, and as a result the lug 77a will cause the nickel credit plate 94 to be moved along with the five-penny credit plate 94a. If there are less than five pennies in the coin channel, the penny credit plate 57 is moved by the sweep arm 61 causing the lever 83 to be rocked on pivot 83c by engagement of the pin 83b in the notch 57e and the five-penny credit bar 77 will be raised so that the lug 77a will be aligned with the broader part of the hole 258 so that the five-penny credit plate 94a will move the equivalent of one step before the nickel credit plate 94 will be moved.

The above arrangement serves to transfer dime credit and five-penny credit to the five-cent credit mechanism in five cent units of credit by the introduction of additional steps when the nickel credit plate 94 either has reached its limit of movement or has engaged a coin feeler pin 23 corresponding to the uppermost nickel in the coin channel.

As the sweep plate 70 is moved to the right in Figure 22 by the sweep arm 62, the spring 240 tends to move the five cent price bar 56, Fig. 32, along with it. The sweep plate 70 will be stopped at a position corresponding to the five cent units credit and the price bar 56 will be stopped by the edge 10b of the price plate 10 at a point corresponding to the five cent units of price of the selection made. Usually the price bar 56 will be stopped before the sweep plate 70 is stopped in which case the spring 240 will be compressed and the latch bar 56c will be moved into engagement with a tooth on the rack corresponding to the difference between price and credit, the bar 56c being held into engagement with the rack 64b by the spring 56b. As the sweep plate returns to normal position, the five cent price bar 56 will be moved with it as will the lug 56d on the latch bar 56c which lug will be positioned in relation to the control bars, Figure 31, as follows:

The relation of the five cent price and credit bars and the corresponding stop points for establishing price and five cent unit credit is shown graphically in Figure 29. The numbered positions opposite the five cent price bar 56 represent stop positions on price plate 10 for various corresponding five cent units of price. The numbered positions opposite the drive bar 76 represent relative stop positions for various five cent units of credit. Some free movement is allowed before the first stop point is encountered to allow the drive bar 76 to become seated in the step plate 94d, Figure 22, in accordance with the dime credit. The numbers adjacent to the teeth on the rack 64b, Figure 29, indicate the positions in which the price bar 56 carrying the lug 56d may be locked and the corresponding credit conditions are as follows:

0 Normal. Too many five cent units credit.
1 Two extra five cent units credit.
2 One extra five cent unit credit.
3 Right number of five cent units credit.
4 Not enough five cent units credit.

The corresponding positions of the lug 56d on the price bar 56 relative to the delivery start control bars 43, 44 and 45 are shown in Figure 31.

The relation of the penny price and credit bars and the corresponding stop points for establishing penny price and credit is shown graphically in Figure 28. The numbered positions opposite the penny price bar 206 represent stop positions on a price plate 10 for various numbers of pennies in the price. The numbered spaces opposite the penny credit bar 52 represent relative stop positions for pennies credit. The numbers adjacent to the teeth in the rack 52e on the bar 52 indicate the positions relative to a reference line 52h in which the penny credit bar 52 may be locked, shown also in Figure 27, and the corresponding penny credit conditions are as follows:

0 Normal. Too many pennies.
1 Right number of pennies.
2 Penny price is one more than the penny credit. Sets penny change guide 80, Fig. 14, in position for four pennies change.
3 Penny price is two more than the penny credit. Sets penny change guide 80 in position for three pennies change.
4 Penny price is three more than the penny credit. Sets penny change guide 80 in position for two pennies change.
5 Penny price is four more than the penny credit. Sets penny change guide 80 in position for one penny change.

*Nickel checking and delivery start control mechanism*

A control mechanism adapted to affect the closure of a delivery release contact U and to control the delivery of a nickel change when certain price and credit conditions are satisfied is shown in Figures 27, 30 and 31. Mechanical interconnections with the cycle control and change mechanism that will be described in detail later are shown in part in Figures 11 and 14.

A check bar 85, Figure 31, is adapted to slide in the same channel in the guide block 63 as the credit plates 94a and 94. It is the purpose of the check bar 85 to block control bar 41 or control bar 45 from closing the delivery start contact U under conditions requiring nickel change when there is no nickel in the nickel change channel or when there is a nickel or five pennies in the coin channels. It is desirable to prevent delivery of a nickel change when a customer has the proper coins to handle the transaction without change. A pin 85a on the check bar 85 extends through a slot in the base plate 91 and through a hole in one leg of a U-shaped check member 272, Figures 18 and 22, adapted to be rocked on a pivot 273 that is attached to the base plate 91 and the guide plate 220. A check link 89 pivoted to the other leg of the check member 272 extends between the guide plate 220 and the release plate 67 the free end of the check link 89 having a stop 89a and a ratchet tooth 89b in engagement with a tongue 93a on a nickel check lever 93, Figure 13. A tension spring 89c is attached at one end to the guide plate 220 and at the other end to the check link 89 at such angle that it tends to hold the free end of the check link up and also tends to rock the U-shaped check member 272 to the normal position shown in the drawings.

A tongue 85b on the check bar 85 extends into a slot 94f in the five-penny credit plate 94a, Fig. 31, this slot being of such length that when the plate 94a is moved to its extreme position, which is the case where there are not five pennies and no nickel in the coin channels, the check bar 85 will be moved a distance slightly greater than one step and the check member 272 will be rocked and the check link 89 will be moved. If there is a nickel in the change tube 222, the lower end of the nickel check lever 93 will engage the coin so that the lever will not be rocked on its pivot 93b. Consequently the tongue 93a will pass over the ratchet tooth 89b so that when the credit plate 94a returns to normal the tongue 93a will hold the check link 89, the check member 272, and consequently the check bar 85 in operated position until released at the end of the cycle. This places notches 85c and 85d in the check bar 85 in alignment with tongues 41a and 45a on the control bars 41 and 45 respectively so that either of these bars can be moved vertically as will be explained.

Control bars 41, 42 and 43, Figs. 30 and 31, are adapted to slide vertically in one channel of the guide block 63 the bar 42 having an arm 42a on which is a lug 42b the position of the lug 42b being shown dotted in Figure 27. A control bar 44 is adapted to slide vertically in a second vertical channel, control bars 45, 46 and 47 are adapted to slide vertically in a third vertical channel and control bar 48 is adapted to slide vertically in a fourth vertical channel. The bar 46 is provided with an arm 46a on which is a lug 46b the position of the lug 46b being shown dotted in Figure 27. A notch is provided in the side of the control bar 44 just large enough to accommodate a cross member 301, Fig. 30. The ends of the cross member 301 are adapted to engage in notches in the control bars 41 and 47. The sides of the intervening control bars and the block 63 are cut away sufficiently so that if the bar 44 is moved vertically while the bar 41 is held, the bar 47 will be raised; also if the bar 44 is raised while the bar 47 is held, the bar 41 will be raised. A lug 48a on the bar 48 overlaps a lug 41b on the bar 41 so that if the bar 41 is raised it will raise the bar 48. The sides of the intervening bars are cut away sufficiently to permit this movement of the lugs 48a and 41b. An arm 48b on the bar 48 is provided with a lug 48c which extends through a slot 306, Fig. 2, in the guide plates 219 and 220, Fig. 18. The slot 306 and a recess 63b in the guide block 63 are such as to permit this vertical movement of the arm 48b and the lug 48c.

A contact bar 308 is adapted to slide vertically on a shoulder rivet 309 in a slot 310 at its upper end, its lower end extending into a channel 63c, Fig. 31, in the guide block 63. An arm 312 on the contact bar 308 is equipped with an insulating bushing extending against one spring of the contact U. A lug 313 on the contact bar 308 extends across the top of the control bars 42 and 46 so that if either of these bars is raised the contact U will be closed.

Figures 16, 17:
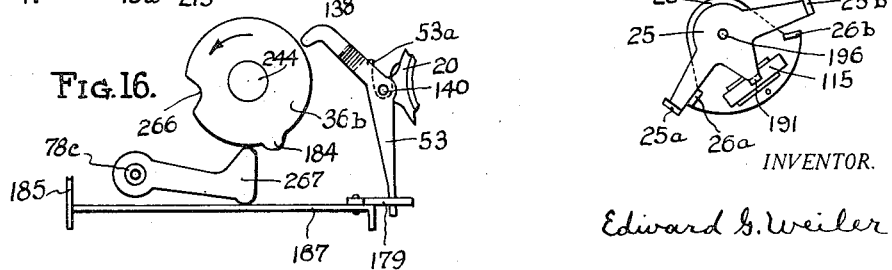
Figure 16 is a fragmentary view showing the start stop cam and its associated mechanism.
Figure 17 is a top view of the penny change delivery device.

As will be more fully described under Cycle Control and Change Mechanism, the continued rotation of the cam 36b, Figure 16, for the first part of a cycle will momentarily release the plate lever 187 and the arm 195 thereon, Figure 11, so that the spring 268, Fig. 22, may move the release plate 67 and consequently the latch plate 64, the latch bar 56c and the lug 56d upward when predetermined price and credit conditions are satisfied. The interaction of the various parts associated with the delivery control mechanism will now be described for the various price and credit conditions that may be encountered and as shown graphically in Figures 28 and 29 previously referred to.

1. Right number of five cent units credit and right number of pennies credit. No change is delivered.

Under this condition, the five cent price bar 56 will be placed in position 3 with the lug 56d, under the control bar 43, Figure 31, the penny credit bar 52 will be placed in position 1 and the lug 42b on control bar 42 will be under a notch 52f in the penny credit bar 52, Fig. 27. As the release plate 67 is moved upward by the spring 268, the latch plate 64 will be rocked causing the latch bar 56c and the lug 56d thereon to be moved upward into engagement with the control bar 43. There is a lug 42c on the control bar 42 extending across the upper end of the control bar 43, therefore the latter tends to move the control bar 42 upward and since the lug 42b on the latter is in alignment with the notch 52f in the penny credit bar 52 it will move upward and since the lug 313, Fig. 30, on the contact bar 308 extends across the arm 42a on the control bar 42 the contact bar 308 will be moved upward to close the contact U closing a circuit to the delivery mechanism.

2. One extra five cent unit of credit and right number of pennies credit. One nickel change delivered.

Under this condition the five cent price bar 56 will be placed in position 2 with the lug 56d under the control bar 44 and the penny credit bar 52 will be placed in position 1 with its notch 52f over the lug 42b on the control bar 42. When the lug 56d is moved upward it will engage the control bar 44 which will push upward on the center of the cross member 301. The end of the cross member 301 that is in engagement with the control bar 47 will be held against movement because the upper end of the control bar 47 will engage the arm 46a on the bar 46 and the lug 46b on this arm will be stopped by the penny credit bar 52. The end of the cross member 301 in engagement with the control bar 41 will, by the lever action of the cross member, tend to move the control bar 41 upward. The upper end of the control bar 41 will engage an ear 42d on the control bar 42 and the latter will be moved upward, the lug 42b being in alignment with the notch 52b and the tongue 41a on the control bar 41 being in alignment with the notch 85c in the check bar 85. The contact bar 308 will therefore be moved upward to close the contact U.

3. One extra five cent unit of credit and no pennies credit when pennies are included in the price. Pennies change delivered in accordance with position of penny credit bar 52.

Under this condition the five cent price bar 56 will be placed in position 2 with the lug 56d under the control bar 44 and the penny credit bar 52 will be placed in position 2, 3, 4 or 5 depending on the pennies in the price. When the lug 56d is moved upward it will engage the control bar 44 which will push upward on the center of the cross member 301. The end of the cross member that is in engagement with the control bar 41 is held against movement since the lug 42b will be stopped by the penny credit bar 52. The end of the cross member that is in engagement with the control bar 47 will tend to move this bar upward. The upper end of this bar 47 will engage the arm 46a on the control bar 46 and the latter will be moved upward since the lug 46b on the arm 46a will be in alignment with the slot 52g in the penny credit bar 52. The upper end of the control bar 46 will engage the lug 313 on the contact bar 308 moving the latter upward closing the contact U.

4. Two extra five cent units of credit and no pennies credit when pennies are included in the price. One nickel change delivered and pennies change delivered in accordance with position of penny credit bar 52.

Under this condition the five cent price bar 56 will be placed in position 1 with the lug 56d under the control bar 45 and the penny credit bar will be placed in position 2, 3, 4 or 5 depending on the pennies in the price. When the lug 56d is moved upward it will engage the control bar 45 the upper end of which will engage a lug 46c on control bar 46 tending to move the latter upward. Since the tongue 45a on control bar 45 will be in alignment with the notch 85d in the check bar 85 and the lug 46b will be in alignment with the slot 52g in the penny credit bar the control bars 45 and 46 will be moved upward raising the contact bar 308 to close the contact U.

5. Not enough five cent units of credit.

Under this condition the five cent price bar 56 will be placed in position 4 and the control bars and guide block 63 are cut away at the point where the lug 56d will be placed so that when it is pushed upward it will not engage any control bar and therefore will not cause the closure of the contact U.

6. Too many five cent units of credit.

Under this condition the five cent price bar 56 will be placed in position 0 and the control bars and guide block 63 are cut away at the point where the lug 56d will be placed so that when it is pushed upward it will not engage any control bar and therefore will not cause the closure of the contact U.

7. No price plate 10 in the price drum, Figure 9, corresponding to the selection made.

Under this condition the penny price bar 206 will be moved by the sweep arm 61 to the position —1 and on its return movement the penny credit bar 52 will remain in position 0 regardless of the pennies credit. In this position both of the lugs 42b and 46b will be blocked by the penny credit bar 52 preventing the upward movement of any of the control bars by the lug 56d under the pull of the spring 268 regardless of the position of the lug 56d and the contact U will not be closed.

*Cycle control and change mechanism*

A base casting 325 is suitably attached to the door 7a, Figure 6, and is also attached to the coin channel mechanism and to the credit control device, as shown in Figure 18. A motor 330 attached to the base casting is fitted with a worm 250 adapted to drive a worm gear 249 supported on a hollow shaft 248 extending through a boss 247 on the base casting, the upper end of the shaft 248 having a gear 246 arranged to drive a gear 245 in a four to one ratio. The 245 is part of a cam assembly 36 having cams 36a, 36b, 36c, 36d and 36e, Fig. 11, adapted to rotate on a shaft 244 and held in place by screws 241 and 241a.

A plate lever 187 is adapted to be rocked in either direction on pivots 27a and 27b on a support plate 27, Figs. 2 and 6, which plate is suitably attached to the base casting 325. An arm 185 on the plate lever 187 engages in a slot 67f in the release plate 67, Figs. 2 and 22, and the upward tension of the spring 268 on the release plate tends to rock the plate lever 187, its position being determined by the cam 36b and a free link 267 pivoted on a post 78c, Figure 16.

A lever 179 is pivoted on the plate 187 and a lever 53 is pivoted on the penny change base 29 at 140, Fig. 16, having one leg extending through a hole in the lower side of the lever 179. A spring 53a tends to hold the levers 179 and 53 normally in the positions shown in Figures 2 and 16 with the lower end of the lever 179 extending across the path of an arm 99b on a refund bar 99 to be described later so that the plate lever will be rocked by the refund bar. However, at the time the depression 266 on the cam 36b passes the link 267 during the first part of a cycle the projection 184 on the cam 36b will rock the lever 53 in turn moving the lower end of the lever 179 out of line with the arm 99b on the refund bar so that the plate lever 187 is free to be rocked by the action of the spring 268 to move the release plate 67 upward, when certain price and credit conditions are satisfied as explained under Delivery Control Mechanism. This causes closure of the delivery contact U.

A clutch and stop mechanism for controlling the motor drive is provided as follows: A face plate 14, Figure 2, is attached to the motor shaft 238 and a worm 250 and a face plate 14a are attached to a hollow shaft 237 adapted to slide or rotate on the end of the shaft 238. A clutch disc 14b is provided between the face plates 14 and 14a. A clutch bar 236, attached to a tube 235 which is adapted to slide on a rod 234 supported at either end by lugs on the base casting 325, is fitted over an annular groove 233 on the hollow shaft 237. A compression spring 234a on the rod 234 tends to hold the face plates 14 and 14a and the clutch disc 14b in contact. A stop link 17 is loosely pivoted at one end to a support 17a on the tube 235 and a pin 17b is provided on its free end adapted to extend through a slot 231 in the base casting 325 into either of two holes 230 or 230a in the gear 245. Figure 15 shows the link 17 in normal position with the pin 17b engaging the edge of the hole 230 and with the spring 234a compressed. In this position the clutch bar 236 being out of engagement with a free spring 229, Figure 3, permits a motor drive contact T to be open; also the clutch face 14a is held out of engagement. A spring 17c attached at one end to the support 17a and at its other end engaging the stop link 17 tends to hold the free end of the link 17 upward.

A start solenoid 226 attached to a frame member 225, when momentarily energized by closure of contact S on dial operation as described, pulls down its plunger 226a against compression spring 226b and likewise a start bar 224 having a lug 224a, Figure 11, on it which lug engages the free end of the stop link 17 pulling the pin 17b out of the slot 230. This allows the spring 234a to move the link 17 to the left in Figure 2 putting the clutch face 14a into engagement and when the magnet is deenergized the spring 17c holds the link 17 upward and the pin 17b rides against the lower side of the gear 245. The clutch bar 236 also engages the free spring 229 with a sliding action which through the medium of an insulating lug 223 closes the motor drive contact T. The motor drives the gear 245 until the hole 230a is rotated to a position in alignment with the pin 17b. The pin 17b will then be raised into the hole 230a by the spring 17c and the link 17 and tube 235 will be moved to the right in Figure 2 against the compression spring 234a. The movement of the clutch bar 236 causes the clutch to be disengaged and the contact T to be opened.

There is some free movement of the clutch bar 236 in the annular groove 233 to insure that the contact T is opened before the clutch is disengaged. The disengagement of the clutch allows the gear 245 to be stopped quickly even though the motor continues to rotate for a short time. The cam assembly 36 is thus driven through the first part of its cycle which is approximately one third of a revolution. The functions of the cams during the first part of the cam cycle have been described.

The remaining part of a cam cycle, namely about two-thirds of a revolution, is started by the closure of the collect contact Z when a package is delivered. This energizes the solenoid 225 causing a repetition of the action just described driving the cam assembly 36 until the pin 17b engages the hole 230 in the gear 245 then the link 17, tube 235 and clutch bar 236 will be again moved to disengage the clutch and open the contact T.

Delivery of change coins

Means are provided for delivering change coins in the second part of the cycle as follows:

*Nickels change.*—A tube 222, Figure 2, having a slot 222a in one side for inserting nickels is supported in a nickel change base 221 which is attached to a change plate 217 and to the base casting 325. A slot 216, Figure 13, is provided between the change base and the plate 217 of such height as to permit the passage of one nickel. A slot 215 in the form of an arc is provided in the plate 217, Figure 15, adapted to receive a tongue 18a on a nickel delivery lever 18 adapted to be rocked on a pivot 18b. This pivot is attached to an arm 78b on a change link 78 which arm extends through an opening 213 in the plate 217. The change lever 78 is pivoted on a post 78c attached to the base casting 325 and has a projection adapted to engage the cam 36d. A spring 73, Figures 2 and 14, attached at one end to the nickel delivery lever 18 and at its other end to a support plate 27 tends to hold the free end of the lever 18 up and also tends to rock the change link 78 but this link is normally held in the position shown in Figure 15 by the cam 36d.

Referring to the description of the nickel checking and delivery start control mechanism it will be noted that under conditions 2 and 4 requiring the delivery of a nickel change the control bar 48, Figures 30 and 31, is raised as follows:

Under condition 2, when the bar 41 is raised the lug 41b engages a lug 48a on bar 48 raising the latter.

Under condition 4, when the bar 45 is raised it will engage the lug 48a on bar 48 raising the latter.

The bar 48 is arranged with sufficient sliding friction that when raised it will remain in its upper position. An L-shaped spring wire 212 is adapted to slide in a tube 211, Figures 11 and 14, supported in the change base 221. The end of the arm on the upper end of the wire 212 extends into a hole in the lug 48c on the control bar 48 so that when the bar 48 is in its upper position the wire 212 is also in its upper position.

A stop bar 74, Figure 15, adapted to slide in a channel in the lower side of the change base 221, Fig. 2, is provided with a tongue that extends into a notch 78a in the change link 78. The lower end of the wire 212, Figs. 2 and 15, in its upper position, in which position a nickel change is required, is out of the path of the bar 74 so that as the cam 36d rotates the change link 78 is rocked by the spring 73 and the tongue 18a on the nickel delivery lever 18 engages the edge of a nickel and, on the continued movement of the cam, pushes the lowermost nickel through the slot 216 from which it passes through opening 207 to the refund receptacle 214.

When a nickel change is not required the wire 212 remains in its normal or lower position in which it blocks the bar 74 and the change link 78 cannot move far enough to permit the tongue 18a to engage the edge of a nickel and no nickel is delivered.

*Pennies change.*—Two tubes 204 and 203, Figure 6, having slots 204a and 203a for inserting pennies are supported in a penny change base 20 which is attached to a penny change plate 21 and to the base casting 325, Fig. 15. Slots 20a and 20b, Fig. 6, are provided between the change base and the plate 21 of such height as to permit the passage of one penny. Slots 21a and 21b in the form of arcs, Figure 15, are provided in the penny change plate 21 adapted to receive tongues 25a and 25b respectively on a penny delivery lever 25, Figure 17, which has the general shape of an inverted V. A shaft 196 passing through a hole in the ridge of the lever 25, Figs. 15 and 17, is attached at its top to the penny change base 20 and at its bottom to a leg 195, Fig. 6, on the base casting 325. A tube 194 which is adapted to turn on the shaft 196 supports the lever 25 on its upper end. A drive plate 26 having drive lugs 26a and 26b is attached to the tube 194 slightly below its upper end and a drive lever 26c is attached to the tube 194 at its lower end. A lug 191 on the penny delivery lever 25 extends downward and its lower end engages a flat spring 115, Fig. 17, that is provided extending across an opening in the plate 26 tending to press the crest of the penny delivery lever 25 against the penny change plate 21.

A link 79 is loosely pivoted at one end to the drive lever 26c, Fig. 6, and is fitted at its other end with a pin 79b adapted to engage one of two diametrically opposite holes 249a or 249b in the worm gear 249, Fig. 5. The pin 79b passes through a hole in an arm 190a attached to a rod 190 that extends upward through the hollow shaft 248 to which the worm gear 249 and spur gear 246 are attached. The hollow shaft 248 extends above the gear 246 to the top of the cam assembly 36 and a tube 80b fitting over this extension of the hollow shaft is provided at its upper end with a penny change guide 80 having two arms 80c and 80d, Figure 14. A sloping lug 80e is provided in the arm 80c adapted to engage a cam section 36e on the top of the cam assembly and an opening 80f is provided in the arm 80d which fits over the tongue 52i that is provided on arm 52a of penny credit bar 52.

A spring 79a, Fig. 6, attached at one end to the link 79 and at its other end to the drive plate 26 tends to move the free end of the link 79 upward but a spring 80a on a support rod 137 is adapted to press downward on the penny change guide 80 with sufficient force that the guide 80 engaging the upper end of the rod 190 normally holds the link 79 against the tension of the spring 79a so that the pin 79b is out of engagement with the worm gear 249.

The operation of the penny credit bar 52 rocks the penny change guide 80, Fig. 14, and the position in which the penny change bar is locked determines the arc on the face of the raised cam section 36e which the lug 80e will engage as the cam rotates during the second part of its cycle. For example if the penny credit bar is in position 2, Fig. 27, the lug 80e will engage the edge of the cam section 36e and will be raised by it in a sliding action raising the penny change guide 80 on the hollow shaft in turn permitting the rod 190 and its arm 190a to be raised by spring 79a to bring the pin 79b into one of the holes in the worm gear 249.

The arc on the cam section 36e that is engaged by the lug 80e is such that the pin 79b will be in the hole 249a or 249b in the worm gear during one half revolution of this gear after which the lug 80e will slip off the cam section 36e and the spring 80a will cause the pin 79b to be disengaged from the hole 249a or 249b in the worm gear 249. This engagement of the pin 79b with the gear 249 causes the link 79 and the arm 26c to rock the drive plate 26 and the penny change lever will first be rocked along its center ridge due to friction against the penny change plate 21 causing one of the tongues 25a or 25b to engage the lowermost penny in a tube 203 or 204. The penny change lever 25 will then be further rotated by a drive lug 26a or 26b causing the penny to be ejected through a slot 28a or 28b onto the base casting 325 and through the hole 207 into the refund receptacle.

If the penny change guide 80 is in position 3, 4 or 5 corresponding to the positions of the penny credit bar 52, Fig. 27, the arc of the cam section 36e engaged by the lug 80e is such that the pin 79b will engage the worm 249 through one, one and one-half or two revolutions respectively before disengagement thus causing two, three or four pennies to be delivered in change. If the penny change guide 80 is in position 0 or 1 the lug 80e is in such position that it will not be engaged by the cam section 36e and therefore no pennies change will be delivered.

Release of mechanism

After change has been delivered a projection 184 on the cam 36b, Figure 16, acting on the link 267, causes the plate lever 187 and its arm 185 to be rocked moving the release plate 67 downward for a short interval against the tension of the spring 268. A lug 183 is provided on the release plate, Figure 22, which engages a pin 28a on the latch 28 releasing the penny credit bar 52 which is restored to normal against the buffer spring 182 by the action of a spring 28b. The edge of a hole 67g in the release plate 67 engages the lug 48c on the control bar 48, if it is in the upper or nickel change delivery position, moving the control bar 48 downward to normal position. Since the latch plate 64, Fig. 32, is adapted to move with the release plate 67 its downward movement disengages the latch bar 56c from the rack 64b allowing the 5c. price bar 56 to be restored to normal by the spring 240. A projection on the check link 89, Fig. 22, is engaged by an edge on the release plate 67 moving the link downward disengaging the ratchet tooth 89b from the tongue 93a on the nickel check lever 93, Fig. 13, allowing the link 89, the lever 272 and the bar 85 to be restored to normal by the spring 89c. A lug 67h on the release plate 67 engages an arm on the pawl 205 rocking it against the tension of a spring 174 releasing the ratchet wheel 92 which permits the price and selection drum, Figure 9, to be restored to normal by the spring 116.

A coin release lever 176, Figure 14, is pivoted at one end on the change plate 217 and its free end engages a hole in the tube 40. A projection 176a on the lever 176 is adapted to be engaged by a raised portion of a cam 36a such that during the latter part of the cycle the lever 176 is rocked moving the tube 40 and consequently the coin stop bar 39 to release all coins in the coin channels in a manner previously described. A compression spring 40b, Figure 26, is provided between the base plate 91 and the coin stop 39 to restore the associated parts to normal when the raised portion of the cam 36a passes the projection 176a. A short interval after the above action takes place to restore all parts to normal and to release the coins the pin 17b on the link 17 engages the slot 230 in the gear 245 causing the contact T to be opened and stopping the rotation of the cam assembly as has been described.

Refund mechanism

A refund mechanism is provided adapted to enable a customer to release, into the refund receptacle, any coins in the coin channels and to restore the mechanism to normal. The various conditions under which the refund device might be operated will first be summarized briefly; then the mechanism will be described in detail.

1. No coin has been deposited and the dial may or may not have been operated. Under this condition the cam and the unit mechanism will be in normal position. The operation of the refund plunger will operate the refund mechanism but will perform no useful function and will restore to normal when the refund plunger is released.

2. One or more coins has been deposited and the dial has not been operated. Under this condition the cam and the unit mechanism will be in normal position. The operation of the refund plunger will refund the deposited coins.

3. Coins have been deposited but not in the proper amount and the dial has been operated. Under this condition the cam will be in normal position but some parts of the mechanism will be in off-normal position. The operation of the refund plunger will refund the deposited coins and restore all mechanism to normal position.

4. Coins have been deposited in proper amount and the dial has been operated. Under this condition the cam will have started its cycle of operation and some parts of the mechanism will be off-normal. One of the following conditions will then obtain.

(a) The cam is being driven by the motor. Under this condition the refund plunger will be ineffective.

(b) The cam is at center stopped position. This condition may occur either if the delivery wheel is not operated by the customer or if it is operated a complete revolution and no merchandise is delivered. Under this condition the operation of the refund plunger restores the mechanism to normal and starts the motor for the second part of the cam cycle which is completed without delivering change.

(c) The cam is at center stopped position and the delivery wheel has been partially operated. Under this condition the refund plunger is ineffective.

In a tube 98, Figure 10, extending through and attached to the base casting 325, a refund plunger 98a is provided adapted to slide in a smaller section of the tube the plunger 98a having a head 98b in an enlarged portion of the tube. A piston 98c is adapted to slide in the enlarged portion of the tube. A compression spring 98d, engaged at one end by cap 98e, tends to hold the piston 98c in normal position the chamber between the cap and the piston forming a compression chambeer 356.

A drive wire 102 is provided having one end extending into a hole in the plunger 98a and passing through a slot 98h in the piston and through a slot 98g in the tube. The drive wire is also provided with a leg 102a which extends upward adjacent to a refund bar 99. A spring 355 attached to a loop on the drive wire 102 is attached at its other end to the casting 325 tending to hold the refund plunger in normal position. A slot 98i provided in the piston, is adapted to receive, through a slot 98f in the tube 98 the ends of two latch levers 96 and 96a which are pivoted on a suitable lug on the base casting 325. The refund bar 99 is adapted to slide on a rod 104 attached at one end to the plate 27 and at its other end to the casting 325 and is held in normal position by a spring 99a. The refund bar 99 comprises an arm 99b which engages the stop bar guide tube 40, Fig. 6, a notch 99c adapted to engage the refund levers 96 and 96a, a lug 99d adapted to engage the drive wire 102a and an arm 99e adapted to slide on a plunger 68a attached to a coin deflector 68. A U-shaped spring wire 96b is attached to the refund levers 96 and 96a in such manner as to tend to hold the legs of these levers apart so that with the edge of the slot 98i in the piston 98c engaging the lever 96a the other refund lever 96 will be held into engagement with the notch 99c in the refund bar as shown in Figure 10.

An L-shaped refund control wire 66 is slideably supported at one end by a bracket 107 attached to the plate 27 and supported at the other end in a hole in the casting 325. One leg of the wire 66 extends through a slot in an ear 108 on the plate 27, Figure 4, and across an opening 109 provided in the plate. An offset portion 66b is provided in the control wire 66, Figs. 4 and 6, and a spring 66e is provided attached at one end to the control wire 66 having an offset portion 66d approximately aligned with the offset portion 66b of the control wire. The upper end of the drive wire 102a extends through a channel formed between the offset portions of the control wire 66 and the spring wire 66e. The construction is such that when the plunger 98a is depressed the end of the drive wire 102a normally causes the control wire 66 to slide endwise far enough to permit the end of the drive wire to engage the lug 99d on the refund bar 99 tending to move this bar. The bar 99 is locked against movement by the lever 96 until on further movement of the refund plunger, the lower end of the lever 96 is engaged by an edge of the slot 98i in the piston. The tension built up by the drive wire 102 on the refund bar 99 will, when this bar is released, move it through its limit of movement the spring 66 not being strong enough to push the drive wire 102a off the lug 99d at offset 66d, Fig. 4, after the tension of the drive wire on the lug 99d has been established, therefore, spring wire 66e will be pushed aside. The movement of the bar 99 results in the following actions:

1. The arm 99b will move the tube 40 and consequently the coin stop bar 39, Figure 19, causing the release of any coins in the coin channels.

2. The arm 99e engaging a compression spring 68b on the plunger 68a will cause the coin deflector 68 to be moved across the opening 360, Figure 15, deflecting the coins released from the coin channels through the hole 207 in the base casting 325 into the refund receptacle 214.

3. The arms 99b will engage a lever 179 pivoted on the plate lever 187 rocking the latter so as to move the arm 185 downward moving the release plate 67 downward causing the release of any operated mechanism as has been described.

4. If the cam is stopped at the center position the downward movement of the arm 185 will also start the motor for the second part of the cycle in the following manner.

A sleeve 30, adapted to slide on the tube 211 attached to the change base 221 is provided with a lug 30a arranged for engagement with the arm 185 and is also provided with a V-shaped plate 30b attached thereto. A coil spring 30c attached at one end to the tube 211 and at its other end to the sleeve 30 is tensioned so as to tend to hold this sleeve up and to move it counter-clockwise in Fig. 14 so that the normal position of the V-plate is as shown in Figure 14. A saddle 352 pivoted on the change base 221 by a pivot 352a has a lower arm which is engaged by the cam 30d, Figure 15, when the cam is in its center position, rocking the saddle with the result that the upper arm of the saddle moves the V-plate so that one leg is over a pin 138 that extends through the post 78c to the link 17. This structure is such that the arm 185, when moved downward, engages the lug 30a moving this and consequently the sleeve 30, the V-plate 30b and the pin 138 all downward causing the link 17 to move the pin 17b out of the gear 245 starting the second part of the cycle of the cam as has been explained. When the cam is not in the center position the saddle 352 and the V-plate 30b will be in the position shown in Figure 14 so that when the arm 185 is moved downward in releasing the mechanism the V-plate will not engage the pin 138 and the link will not be moved to start a cycle of motion.

After the refund bar 99 has been operated, as explained, the notch 99c will engage the refund lever 96a and when the plunger 98a is released the bar 99 will be held until the piston 98c is returned by the action of the spring 98d into engagement with the lever 96a. The action of the air chamber 356 on the piston 98c is such that sufficient time elapses before the piston engages the lever 96a to release the bar 99 so that all coins in the coin channels will have time to be released and properly guided into the refund receptacle. Upon restoral of the refund plunger the end of the drive wire 102a moves upward as seen in Fig. 4 engaging an arm 66c on spring 66e restoring the wire parts 66, 66e etc. to normal positions as shown in Fig. 4.

At any time that the delivery mechanism is off normal or that the motor 330 is operating to rotate the cam the refund plunger is made ineffective by blocking the sliding action of the refund control wire 66, Fig. 4. If the delivery mechanism is off normal this wire 66 is blocked by the arm 340, Figs. 4 and 43, on the delivery mechanism extending through the opening 109 in the plate 27 to engage the wire 66 as has been explained. If the motor is operating, the clutch bar 236, Fig. 11, being moved to the left in Fig. 4 as has been explained, will, at the notch 357, engage an offset portion 66a of the wire 66 preventing its sliding action. When the wire 66 is blocked from sliding the spring wire 66c on the refund control wire 66b will cause the end of the drive wire 102a to be deflected, by the offset 66d of spring 66e, the end of the wire 102a being easily moved aside at this point so that it will not engage the lug 99d on the refund bar 99 to operate the latter.

A bent wire 103 is provided having a U-shaped end extending through the slot 98g in the tube 98 with one leg in engagement with the edge of the slot 98i in the piston 98c and having its other end attached to a free spring 359 associated with a refund contact V, Figures 10 and 11, which in normal position holds the contact V closed. As soon as the refund plunger is moved from normal position the bent wire 103 is freed to be moved by the free spring 359 removing the pressure on the insulating lug 358 permitting the refund contact V to open as a guard against operating the device as long as the refund plunger is in off normal position.

*Summary of cycle of operation*

Assume that an article designated A is to be selected having a price of 17 cents and that the correct amount, namely, one nickel, one dime and two pennies are inserted in the coin entrances 11a, 11b and 11 respectively, Fig. 1. The coins will pass through the coin channels into positions shown dotted in Fig. 19 the two pennies being arrested and held in tandem by the finger 39a, the nickel by finger 39b and the dime by finger 39c on the coin stop bar 39.

The customer places a finger in the dial hole A, moves it against the stop 15a then releases the dial which will be restored to normal position by the spring 55, Fig. 11. During the first part of the forward movement of the dial the notch 15d in the dial will engage the pin 65a on the lever 65, Fig. 19, pulling downward the link 69. Pin 69a on link 69 will engage the hook 81c on slide bar 81 moving the latter downward. The bent rod 81a on bar 81, Fig. 12, passing through a hole on ear 72d of coin feeler bar 72 will tend to rock the feeler bar but this is prevented when any coin is in a channel by engagement of ear 72a, 72b or 72c with a coin. Consequently, the bar 81, due to the slanting construction of rod 81a, moves the U-shaped wire 196, Figs. 12 and 22, against the tension of spring 201. On continued forward movement of the dial a sloped lip 84b of the drum operating link 84, pivoted to collar 97A on dial shaft 97, will engage the U-shaped wire 198 rocking the link 84 so that the lip 84b engages in a hole 92b in ratchet wheel 92, Figs. 7 and 9, advancing the entire price and selection drum of Fig. 9 so that the pawl 205 engages the first tooth of ratchet wheel 92. This places the price and selection drum into position for selection of article A by placing the guide a, Fig. 2, in alignment midway between the guide grooves 12f and 13f and simultaneously places a price plate 10 in alignment with the nickel price bar 56 and penny price bar 206 as shown diagrammatically in Fig. 32.

The price plate for a 17 cent article will have the edge 10b cut out at position 3, Fig. 8, and the edge 10a will be cut out at position 2, corresponding to three 5¢ units of price and two penny units of price respectively. It will be noted that Fig. 8 as shown represents the form of price plate 10 for an 8 cent article. When the dial is moved far enough to have the price and selection drum locked into an off normal position by the pawl 205, as explained, the pin 92a on ratchet wheel 92, Fig. 9, will be moved away from the arm 86a on the dial off normal lever 86, Fig. 19, permitting this lever to be rocked by spring 88a on pivot 86b and the link 88 will cause the top of the slide bar 81 to be moved to the left in Fig. 19 placing it in position to cause operation of contact S when the dial returns to normal.

As the dial returns to normal position the pin 65a will be engaged by an edge of the notch 15d in the dial causing lever 65 to be rocked slightly and when the spring 88a, Fig. 19, having a component of pull upward will cause the slide bar 81 to move upward. Since the upper end of bar 81 has been moved to the left as has been explained the hook 81b will engage a pin 35b on disc 35 rocking the latter against the tension of one of the springs 154 of contact S shown in Fig. 2. The pin 35b will slip off the hook 81b near its upward position allowing the disc to be restored to normal by the spring 154. This movement will cause closure of contact S for an interval long enough to insure the operation of solenoid 226 which is energized from ± through solenoid 226 and contacts S, Y and V to GD, Fig. 48.

The solenoid 226 pulls downward the start bar 224, Fig. 11, and a lug 224a on the upper end of bar 224 pulls downward the free end of stop link 17 pulling the pin 17b on link 17 out of the hole 230 in gear 245, Fig. 15. The release of the link 17 permits the spring 234a to move the tube 235 to the left in Fig. 2 and the clutch bar 236 attached to tube 235 moves the motor clutch plates 14 and 14b into engagement; also the clutch plate 236 engages slantingly a spring 229, Fig. 3, causing closure of motor contact T.

The motor then drives the worm gear 249 and thru the medium of gear 246 drives the cam gear 245 until the pin 17b on link 17 engages the hole 230a. This moves the link 17 and the tube 235 to the right in Fig. 2 causing disengagement of the motor clutch and opening the contact T stopping the rotation of the cam quickly even though the motor runs for a time on its momentum after its circuit is opened. During this movement of the cam, which is approximately one third revolution, three movements take place in sequence as follows:

*First. Coins sensing.*—The cam 36c, Fig. 23, engages lever 33b which moves plate 24, Figs. 24 and 25, laterally allowing the particular pins 23, which engage coins in the coin channels, to protrude above the surface of plate 91.

*Second. Credit establishment.*—The cam 36d moves the sweep bar 87 to the left in Fig. 15 rocking the lever 38 which rotates the sweep operate lever 58, Figs. 2 and 14, through the medium of the pin 38b. This tends to move the end of lever 61, the link 61b, the penny credit plate 57, and the penny credit bar 52 to the right in Fig. 22 until the plate 57 is stopped by the pin 23 corresponding to the highest penny in the channel. It also tends to move, by spring 28b in Fig. 32, the latch 28, and the penny price bar 206 until stopped by the price plate 10. This establishes a differential of excess pennies price over pennies credit as illustrated graphically in Fig. 28. In this particular transaction, where the exact number of pennies required have been inserted, the latch 28 will be engaged in the first tooth of the rack 52e on bar 52 which is referred to as position 1.

The sweep operate lever 58 also tends to move the end of lever 62, the sweep plate 70 and the drive bar 76 to the right in Fig. 22. The bar 76 will tend to rock the dime credit plate 75 and since there is one dime in the channel the lowermost pin 23 will be protruding stopping the plate 75 in position to cause the end of drive bar 76 to engage the second step in the step late 94d. This will move the plate 94d and 94a one step to the right in Fig. 22 after which the tongue 77a in Fig. 30, which has been moved up by the rocking of lever 83, will engage the nickel credit plate 94 moving this to the right until it is stopped by the lowermost pin 23 associated with the nickel channel, there being one nickel in the channel for this transaction. The movement of plate 70 and consequently 64, in Fig. 32, tends to move, by spring 240, the nickel price bar 56 until it is stopped by price bar 10. This establishes a differential of excess nickel credit over nickel price as illustrated graphically in Fig. 29. In this particular transaction the latch bar 56c will be engaged in the fourth tooth of the rack 64b which, in Fig. 29, is indicated as position 3 from normal position.

*Third. Article delivery control.*—A circuit is closed to free the delivery mechanism in the following manner. On further rotation of the cam for the first part of the cycle the link 267, Fig. 16, passes the depression 266 in cam 36b. This allows the spring 268 to move the plate 67 upward in Fig. 22 rocking the arm 185, plate 187 and link 267 momentarily, Fig. 11, since the end of arm 185 extends into a hole 67f in plate 67 as shown in Fig. 2. The momentary movement of plate 67 rocks the latch plate 64, Figs. 11 and 32, and consequently moves the latch bar 56c upward. The lug 56d on bar 56c, is in position 3, Fig. 31, for this transaction and consequently in alignment with control bar 43. On the upward movement of control bar 43 it engages a lug 42c on control bar 42 raising this bar and arm 42a and lug 42b attached thereto. In this transaction the lug 42b is in alignment with the notch 52f in penny credit bar 52, Fig. 27, and consequently the arm 42a is raised far enough to engage lug 313 on contact bar 308, Fig. 30, raising the latter so that arm 312 thereon causes the closure of delivery start contact U.

The closure of contact U closes a circuit from GD through magnet 126 in the delivery mechanism, Fig. 36, to ± operating the magnet 126 which locks through its own contact W and contacts X and V to GD.

*Article delivery.*—The actuation of magnet 126 frees the delivery wheel 202 for manual actuation as follows. The wheel 202 is moved clockwise by the handle 136, Fig. 1. A stop latch 132 which is normally in engagement in a recess 128 in the delivery wheel 202, is moved toward the right in rear views Figs. 36 and 36A and, since magnet 126 is operated, an arm 125 on its armature 124 engages the end of release arm 127 on stop latch 132 rocking the latter out of the recess 128 in wheel 202 so that the wheel is freed for rotation. When the end of the latch 132 is moved out of the recess 128 it is returned to the left in Fig. 36 by spring 129 but its end engages the periphery of wheel 202 and being thus held in a lowered position a pin 119 on latch 132 engages a vertical arm on off normal lever 122 rocking the latter opening contacts X and Y and moving upward the off normal rod 118 which renders the refund mechanism ineffective.

The wheel can now be moved one complete revolution which, through the medium of bevel gears 326 and 327, shaft 335, crank 324 and links 320 and 323, Fig. 37, rocks the arm 315, the shaft 314 to which it is attached, and rocks another arm 315 attached to shaft 314 at its opposite end, Fig. 38, resulting in the parallel movement of the delivery bar 111 toward the front and back to normal position toward the rear of the machine. During the first part of this movement a cam 158 on gear 327, Fig. 34, releases the selection control lever 164 by releasing pin 159 on the arm 160 of lever 164 so that the curved arm 157 on the lever 164 releases the selection levers 12a and 13a allowing them to be pulled downward by springs 12b and 13b. Through the medium of the wires 12c and 13c this pulls downward the selection bars 12d and 13d, Fig. 43, against the tension of the weaker springs 12e and 13e and the arms 12 and 13 are guided into slots 9g on either side of the guide a which is now positioned at the top in Fig. 2. Since both of the slots 9g extend to a dotted line designated (1) in Fig. 2 the rotary selection lever 12a will cause the selection rack 293 to be placed in position 1R shown in Fig. 40 and the horizontal selection lever 13a, Fig. 34, will be rotated so that the end of its arm 13g will be brought in line with stop point 1′ of stop lever 149 shown in Fig. 36.

On further rotation of the delivery wheel the cam 141, Fig. 36, will free the pin 143 on lever 149 and spring 145, Fig. 35, will move selection rack 193 horizontally until stopped by stop point 1′ engaging the arm 13g. The selection pin designated A′ will by this action be placed in alignment with the tongue 289, Fig. 34, of the delivery element 299 associated with the storage compartment A″. This occurs before the delivery bar 111 has reached its furthest point of movement toward the front of the machine. On a slight further movement the selection pin A′ is engaged by the arm 289 of the delivery element causing it to be rocked so that on the continued movement of the delivery wheel, as the bar 111 is then moved toward the rear, a package in compartment A′ will be ejected moving package gate 29, Fig. 34, causing closure of contact Z. At about this same time the arm 289 of the delivery element will engage a barrier 287 restoring the delivery element to normal position.

*Completion of cycle of coin mechanism.*—The closure of contact Z will close a circuit from GD through magnet 226 to ± energizing this magnet which, by releasing the part 17 from the cam gear, will cause the motor to drive the cam through the remainder of its cycle. No nickel change will be delivered because the bar 48 and its lug 48c, Fig. 2, is not moved upward on this transaction therefore wire 212, Figs. 2 and 15, connected thereto remains in its normal or lower position blocking the bar 74 so that the change link 78 cannot move far enough to engage the edge of a nickel. No pennies change will be delivered on this transaction because the lug 80e on arm 80c, Fig. 14, will not be in posiiton to engage cam section 36e and therefore the arm 80 attached to tube 80b, Fig. 5, will not be raised to permit pin 79b to engage in one of the holes 249a or 249b in gear 249 so no pennies change will be delivered. During the latter part of the cam cycle all parts will be restored to normal positions as explained under the heading "Release of Mechanism."

There are seven possible price, credit and change conditions in which certain details of operation vary as explained under the heading "Nickel Checking and Delivery Start Control Mechanism." In any of these conditions in which the contact U is closed to free the delivery mechanisms the same general cycle of operation occurs as given above except that when a nickel change is required the wire 212 is raised out of the path of the stop bar 74 so that the change link 78 can move far enough to permit the tongue 18a to engage a nickel and a nickel is ejected by action of the cam 36d on link 78;

also when penny change is required the lug 80e on arm 80c, Fig. 14, will be in position to engage cam section 36e raising the arm 80 attached to tube 80b, Fig. 5, permitting the pin 79b to engage in one of the holes 249a or 249b in gear 249. The shape of the cam section 36e is such as to cause the pin 79b to be engaged for ½ revolution of gear 249 for each penny change required as determined by the position in which the arm 80 is placed by the credit bar 52.

If the price and credit conditions are one of those in which the contact U is not closed then the delivery mechanism is not freed for operations. In this condition or in any other condition in which the operating cycle is not carried to completion the refund plunger is pressed resulting in the restoral of all parts to normal positions as explained under the heading "Refund Mechanism."

Alternate totalizing mechanism

Figure 47 is a graphic representation, including the electric circuits, of an alternate method of totalizing the value of coins deposited utilizing well known contact devices in the coin channels.

A bar P1 is provided which is moved one step of the associated rack for each penny deposited and is thus positioned to function with the device shown in Figure 28. The arrangement is such that the passage of a penny in the channel P momentarily closes a circuit to energize the magnet P2 which moves its armature against a stop P3 so positioned that the tongue P4 pivoted on the armature will engage the rack P5 and move it a distance of one tooth.

Likewise a bar N1 is provided which is moved one step of the associated rack N5 for each five cent unit of value deposited and is thus positioned to function with the device shown in Figure 29. The arrangement is such that the passage of a nickel in the channel N will momentarily close a circuit to energize the magnet N2 which moves its armature against a stop N3 so positioned that the element N4 pivoted on a link N8 will be rocked by this armature into engagement with the rack N5 and will move it a distance of one tooth.

The passage of a dime in the channel D will momentarily close a circuit to energize the magnet D2 which moves its armature against a stop D3 this stop being so positioned that the element N4 similarly engaging the rack N5 will move it a distance of two teeth or two five cent units of value. The value of nickels and dimes deposited is thus accumulated by positioning the bar N1. Other denominations of coins may be thus totalized by making the distance the rack is moved by such coin proportional to the units value of the coin.

Latches P6 and N6 lock the bars P1 and N1 respectively and may be arranged to be released by release plate 67, which is operated, as has been described, and the bars P1 and N1 will be restored to normal positions by springs P7 and N7.

SUMMARY OF REFERENCE CHARACTERS

A, B—P, codes for article selection, Fig. 1.
A', B'—P', selection pins corresponding to selection codes, Fig. 35.
A'', B''—P'', package chutes corresponding to selection codes, Fig. 35.
a, b—c, guide members corresponding to selection codes, Fig. 2.
S, T—Z, electric contacts.
0 to 5, used to designate positions only.
6—6d, 7—7b, 8, 8a, cabinet parts, Fig. 1.
9—9i, parts of selection drum, Fig. 9.
10—10d, parts of price plate, Fig. 8.
11—11b, coin entrances, Fig. 1.
12—12g, feeler parts for rotary positioning of 293, Figs. 34, 35 and 43.
13—13g, feeler parts for horizontal positioning of 293, Figs. 34, 35 and 43.
14—14b, motor clutch parts, Fig. 2.
15—15d, dial parts, Figs. 1 and 19.
17—17c, stop link parts, Figs. 2 and 15.
18—18b, nickel delivery lever parts, Figs. 2 and 15. See part 78.
19—19c, mounting holes in casting 34a.
20—20b, 21—21b, penny change parts, Figs. 14 and 15.
22—22b, coin display slots, Fig. 1.
23—23b, coin feeler pin parts, Fig. 24.
24—24d, control plate for pins 23, Figs. 24 and 25.
25—25b, 26—26b, penny change delivery parts, Figs. 15 and 17.
27, support plate.
27a—27b, pivot supports for lever 187, Figs. 2 and 6.
28—28b, penny credit latch parts, Figs. 22 and 28.
29—29d, package controlled gate parts, Figs. 34 and 48.
30—30c, parts responsive to refund mechanism to release link 17 for second part of cycle, Figs. 11 and 14. See parts 138, 185 and 352.
31—31b, coin channels, Fig. 19.
32, 32a, 33—33d, parts for moving plate 24, Figs. 23 and 25.
34—34c, castings for coin channels, Figs. 11, 14 and 19.
35—35c, parts for closing contact S, Fig. 2.
36—36e, control cam elements, Figs. 11, 14, 15 and 16.
38—38b, parts to operate sweep lever 58, Fig. 15.
39—39c, coin stop elements, Fig. 19.
40—40b, guide supports for 39, Fig. 19.
41—41b, 42—42c, 43, 44, 45, 45a, 46—46c, 47, 48—48c, control bars for checking credit and change conditions, Figs. 30 and 31.
49—49e, parts for supporting coins in tandem in each coin channel, Figs. 11 and 19.
50, refund channel, Fig. 19.
51—51b, refund openings, Fig. 19.
52—52i, penny credit bar parts, Figs. 14, 22 and 30.
53, 53a, lever to make refund mechanism operative only at intermediate stop point of cam, Fig. 16.
54, beveled edge on openings 51—51b, Fig. 19.
55, 55a, dial return spring parts, Fig. 11.
56—56d, nickel price bar parts, Figs. 29 and 32.
57—57e, penny credit plate parts, Figs. 22 and 30.
58—58b, sweep operate lever parts, Figs. 2 and 18.
59—59b, supports for guide block 63, Figs. 30 and 32.
60—60d, governor parts, Fig. 19.
61—61d, upper sweep arm parts, Figs. 2 and 18.
62, 62a, lower sweep arm parts, Figs. 2 and 18.
63—63c, guide block parts, Figs. 30 and 31.
64—64b, latch plate for 5¢ credit, Figs. 29 and 32.
65—65b, dial lever parts, Fig. 19.
66—66d, refund control wire, Figs. 2, 4 and 6.
67—67h, release plate parts, Figs. 11 and 22.
68—68c, coin deflector parts, Figs. 6, 10 and 19.
69, 69a, dial operate link, Fig. 19.
70—70d, nickel sweep plate, Fig. 32.
72—72d, coin feeler bar parts, Fig. 19.

73, spring for lever 18, Figs. 2 and 14.
74, nickel change stop bar, Fig. 15.
75—75c, dime credit plate parts, Fig. 22.
76, 76a, nickel credit drive bar, Fig. 22.
77, 77a, five penny credit bar, Fig. 30.
78—78c, five cent change link parts, Fig. 15. See part 18.
79—79b, link parts for penny change, Figs. 5 and 6.
80—80f, penny change control parts, Figs. 5 and 14.
81—81c, dial operated guide bar for actuating disc 35 to close contact S, Figs. 2, 12 and 19.
82—82c, guide brackets for bar 81, Figs. 19, 21 and 21A.
83—83b, five penny credit lever parts, Figs. 25 and 30.
84—84b, drum operating link, Figs. 7 and 22.
85—85d, check bar parts for checking 5¢ change, Fig. 31.
86—86b, dial off normal lever parts, Fig. 19.
87, 87a, sweep bar, Fig. 15.
88, link between 81 and 86, Fig. 19.
88a, spring for 88.
89—89c, nickel change check parts, Figs. 13 and 22.
90, slot for 86a, Fig. 22.
91—91m, base plate parts for coin totalizing mechanism, Figs. 11, 22 and 25.
92—92b, selection ratchet wheel parts, Figs. 7 and 9.
93—93b, nickel change check lever parts, Fig. 13.
94—94f, nickel credit plate parts, Figs. 22 and 30.
95, 95b, 95c, penny change check plate parts, Figs. 22 and 30.
96—96b, levers to lock refund bar, Fig. 10.
97, dial shaft, Fig. 11.
97a, dial shaft collar, Figs. 11 and 22.
98—98i, refund tube parts, Fig. 10.
99—99e, refund bar parts, Figs. 6 and 10.
100, bushing for dial shaft, Fig. 11.
101, boss for 100, Fig. 11.
102, 102a, refund drive wire, Figs. 2 and 6.
103, contact control wire, Fig. 10.
104, rod for refund bar 99, Fig. 10.
105, slot for dial lever pin, Fig. 19.
106, spring for plate lever, Fig. 23.
107, bracket for refund control wire 66, Figs. 4 and 14.
108, ear on plate 27, Fig. 4.
109, opening in plate 27, Figs. 2 and 43.
111, 112, delivery bar, Figs. 34, 35 and 37.
113, removable cover, Fig. 34.
114, selection drum stop spring, Fig. 9.
115, flat spring, Fig. 17.
116, price drum spring, Fig. 9.
117, 117a, off normal bar parts, Fig. 34.
118, off normal rod, Figs. 34 and 36.
119, pin to operate off normal lever 122, Fig. 36.
120, ridge in coin channel, Fig. 11.
121, 122, off normal lever, Fig. 36.
123, pivot, Fig. 36.
124, 125, 126, delivery release relay, Fig. 36.
127, release arm on stop latch 132, Fig. 36.
128, recess in delivery wheel, Fig. 36A.
129, 130, 131, 132, stop latch mechanism, Figs. 36 and 36A.
133, 134, 135, ratchet teeth and pawl, Fig. 36.
136, handle for delivery wheel, Figs. 1 and 34.
137, recess for stop latch, Fig. 36.
138, pin for releasing link 17, Fig. 14. See part 30.
139, boss supporting delivery wheel, Fig. 34.
140, pivot for 53, Fig. 16.
141, delivery wheel cam, Fig. 36.
142, slot in delivery wheel housing, Fig. 36.
143, pin on stop lever 149, Fig. 36.
144, 145, 146, selector rack parts, Fig. 35. See part 293.
147, 148, 149, stop lever parts, Fig. 36.
153, slot in 91, Fig. 25.
154, spring for contact S, Fig. 2.
156, opening for 157, Fig. 35.
157, curved arm on 164, Fig. 34.
158, cam on gear 327, Fig. 34.
159, 160, arm on 164, Fig. 34.
161, opening for selection bar arms, Fig. 44.
163, 164, selection control levers, Fig. 34.
166, guide for 87, Fig. 15.
167, off normal wire, Fig. 43. See part 117.
169, 170, support rod and return spring for 58, Fig. 18.
172, positioning arm for 293, Fig. 35.
176, 176a, coin release lever, Fig. 14.
177, 178, springs for 61a and 62a, Figs. 2 and 18.
179, lever on 187, Fig. 2.
181, stop screw for dial, Fig. 6.
182, buffer spring, Fig. 27.
183, lug on 67 to release penny credit latch, Fig. 22.
184, projection on cam 36b, Fig. 16.
185, release arm on 187, Figs. 2 and 11.
186, pivot screw for 314, Figs. 1 and 36.
187, plate lever for releasing mechanism, Figs. 2 and 11.
190, 190a, penny change control rod, Fig. 5.
191, lug for rocking 25, Fig. 17.
192, sloping floor, Fig. 34.
193, guide rod for 52, Fig. 14.
194, tube supporting drive plate 26, Fig. 6.
195, leg on base casting, Fig. 6.
196, shaft for 25, Fig. 17.
198, U shaped wire to control 84, Figs. 12 and 22.
199, bushing for 198.
200, delivery wheel cover, Fig. 1.
201, spring for 198.
202, delivery wheel, Figs. 1. and 36.
203, 203a, 204, 204a, 204b, penny change tubes, Figs. 2 and 6.
205, pawl, Fig. 7.
206, penny price bar, Fig. 32.
207, coin return hole, Figs. 11 and 15.
211, 212, nickel change control parts, Figs. 2 and 15.
213, opening in plate 217, Fig. 15.
214, refund receptacle, Figs. 1 and 11.
215, slot in nickel change plate, Fig. 15.
216, slot in nickel change base, Fig. 13.
217, nickel change plate, Fig. 15.
218, 219, 220, guide plates for price bars, Figs. 9A and 18.
221, nickel change base, Fig. 13.
222, nickel change tube, Fig. 2.
223, insulator, Fig. 3.
224, 224a, start bar on solenoid 226, Fig. 11.
225, frame member, Fig. 11.
226, 226a, 226b, solenoid parts, Fig. 11.
227, 228, guide rods, Fig. 32.
229, free spring for contact T, Fig. 3.
230, 230a, stop holes in cam gear 245, Figs. 15 and 48.
231, slot in base casting, Fig. 15.
233, annular groove for clutch control, Fig. 2.
234, 234a, 235, 236, clutch control parts, Fig. 2.
237, hollow shaft on 238 for worm, Fig. 2.
238, motor shaft, Fig. 2.
240, coil spring for 56 and 64, Fig. 32.
241, 241a, screws for cam, Fig. 11.
244, cam shaft, Fig. 11.

245, cam gear, Figs. 11 and 15.
246, small gear Figs. 14 and 15.
247, boss on casting for gear bearing, Fig. 2.
248, hollow shaft for gears 246 and 249, Fig. 5.
249, worm gear, Fig. 2.
250, worm, Fig. 2.
251, return spring for 52, Figs. 14 and 22.
252, ear on 52 for spring, Fig. 22.
253, support plate for selection levers, Fig. 34.
256, 257, ears on 253, Figs. 34 and 35.
259, 260, shaft and support tube for 12a, Fig. 35.
262, slot for 83a, Fig. 25.
264, slot for 83b, Fig. 25.
265, spring for 276, Fig. 43.
266, depression in cam 36b, Fig. 16.
267, free link for cam 36b, Fig. 16.
268, spring for release plate 67, Fig. 22.
269, notch in 91, Fig. 22.
272, U shaped member to check nickel change, Figs. 18 and 22.
273, pivot for 272.
275, pivot for 276.
276, off normal lever, Fig. 43.
277, ear for springs 12e and 13e, Fig. 43.
278, 279, guides for selector bars, Fig. 43.
282, 285, cross plates, Fig. 44.
286, frame for feeler bars, Fig. 44.
287, barrier to restore delivery element 299, Fig. 34.
288, 289, delivery element parts, Figs. 34 and 39.
290, 291, 292, 293, selector rack parts, Fig. 35.
294, U shaped spring for delivery element, Figs. 34 and 39.
295, pivot for delivery element, Fig. 39.
296, support for 295, Fig. 34.
297, tube for delivery element, Fig. 39.
298, slot for delivery element in base plate 339, Fig. 35.
299, delivery element, Figs. 34 and 39.
300, opening in 315, Fig. 37.
301, cross member, Fig. 30.
303, 304, guides for delivery bar 111, Figs. 37 and 38.
305, nut for 186, Fig. 36.
306, slot for 48c, Fig. 2.
308, 309, 310, 312, 313, device for closing contact U.
314, 315, 316, 317, 318, 320, 321, 322, 323, 324, crank and linkage by which rotation of gear 321 and shaft 335 causes parallel movement of delivery bar 111, Figs. 36, 37 and 38.
319, penny change check lever, Fig. 22.
325, base casting, Figs. 2 and 6.
326, bevel gear teeth in delivery wheel, Fig. 36,
327, bevel gear, Fig. 36.
329, support lug for plate 332, Fig. 36.
330, motor.
331, bracket, Figs. 35 and 37.
333, bearing for shaft 335, Fig. 36.
334, bearing post on 338, Fig. 36.
335, shaft, Fig. 36.
338, delivery wheel housing, Figs. 34 and 36.
339, base plate, Figs. 34 and 35.
340, off normal arm, Fig. 43.
345, 346, channels for mechanism, Fig. 46.
347, partition plate, Figs. 46.
348, 349, plates on doors, Fig. 46.
350, 351, walls of package chutes, Fig. 46.
352, 352a, saddle rocked at intermediate stop position of cam, Figs. 14 and 15.
353, opening for package, Fig. 34.
355, plunger return spring, Fig. 10.
356, air chamber, Fig. 10.
357, notch in clutch bar 236, Fig. 11.
358, 359, parts for contact V, Fig. 11.
360, opening at deflector 68, Figs. 6 and 15.

I therefore particularly point out and distinctly claim as my invention:

1. In a coin operated unit for vending apparatus, a series of channels for receiving and retaining coins of various values, an individual coin feeler movable into each space in which a coin may be retained in said channels, a totalizing device movable into engagement with such of the coin feelers as engage and are stopped by coins in the channels, and passing clear of all coin feelers not stopped by coins, said stopped coin feelers serving to stop said totalizing device unit distances from a zero value reference point proportional to the value represented by said coin feelers that are stopped by coins.

2. In a coin operated unit for normally locked selective vending apparatus, a removable drum comprising a part having recesses of varying depths for article selection and a series of inserts of varying shapes for setting the price corresponding to each article selection, means for positioning said drum for article selection and price setting means responsive to the positioned price insert on said drum to unlock said vending apparatus when coins of proper value are inserted and means responsive to the positioned recesses of said drum to select and deliver an article when the vending apparatus is operated.

3. In a coin operated unit for vending apparatus, a mechanism adapted to establish a stop point which by its position represents the total value of coins deposited, an article selector device adapted to establish a stop point simultaneously with article selection which by its position represents the value of a selected article, a credit feeler, means for driving the credit feeler against said first mentioned stop point so as to stop the same a distance from a zero reference point proportional to the value of coins deposited, a price feeler, means for driving said price feeler against the second said stop point and means to lock said feelers in the relative positions reached when they strike said stop points to establish a differential between price and credit.

4. In a coin operated unit for vending apparatus, a mechanism adapted to establish a stop point which by its position represents the total value of coins deposited, an article selector device adapted to establish a stop point simultaneously with article selection which by its position represents the value of a selected article, a credit feeler such that when driven against the first said stop point is stopped a distance from a zero reference point proportional to the value of coins deposited, a price feeler adapted to be driven against the second said stop point, means to lock said feelers in the relative positions reached when they strike said stop points to establish a differential between price and credit, a delivery feeler, means for moving said delivery feeler relative to said credit and price feelers to free the vending apparatus for operation and means in said price and credit feelers to prevent the operation of said delivery feeler when a desired differential between price and credit has not been established.

5. In combination in a coin controlled vending apparatus, a coin control mechanism, an article selector unit comprising a movable member having a series of stops positionable for article selection, a series of feeler members settable by said stops, an article delivery unit, means operated by said article delivery unit for moving said feelers into operative relation with said stops, means controlled by said feelers and cooperating with said delivery mechanism to effect selection of an article, electrical control means operated by said coin control mechanism for initiating operation of said delivery mechanism and means operated by said delivery mechanism and connecting with said electric control means for restoring said coin control mechanism to normal position.

6. In an electric control for vending apparatus, a cycle control cam, a motor drive for said cam, a motor start magnet, a coin operated means for closing a circuit to said start magnet, a motor maintaining switch, a delivery start magnet, means for comparing price with value of coins deposited and elements operated thereby in response to a favorable comparison to energize the delivery start magnet freeing said vending apparatus for operation, off normal switches opening circuits to prevent false start by coins when vending apparatus is partially operated, an article controlled switch actuated by an article in process of delivery causing second operation of motor start magnet to complete the cycle of operation and electric circuits interconnecting said switches and magnets with a source of electric power.

7. In a vending apparatus, a dial, a common coin control and selector mechanism having stops positionable by said dial for article selection, a multiple article delivery mechanism, coin controlled electric devices adapted to free said delivery mechanism for operation, a series of article selection feelers actuated by operation of said delivery mechanism amounts permitted by said stops in said selector mechanism the resulting positions effecting selection of an article for delivery and electric devices actuated by a package in delivery to restore said coin control and common selector mechanism to normal condition.

8. In a vending apparatus, a dial, a multiple article storage and delivery mechanism including a row of package chutes, a slot extending lengthwise through the bottom of each chute, a common delivery bar adapted to be reciprocated underneath all chutes, a delivery element pivoted on said delivery bar in alignment with each said slot having a side arm adjacent to its pivot point and normally positioned out of said slot, a selector rack having rigidly attached projections, means responsive to said dial to position said selector rack to bring one of said projections into the path of the side arm of one of said delivery elements to cause said delivery element to be rocked so as to extend through the slot into engagement with a package when said delivery bar is reciprocated and means engaging said side arm to restore said delivery element to normal position.

9. In a selective vending apparatus having a common external selector with positionable stop points for article selection, a series of package chutes, a normally locked delivery device movable through a cycle of motion to effect delivery of merchandise, electrically operated means to unlock said delivery device for operation, a series of article selection feelers each moved by said delivery device amounts permitted by said stop points in said external selector to effect selection of an article for delivery and means operable when said delivery device is in a partially operated condition to prevent improper operation of said common external selector.

10. In a vending apparatus, a manually operated delivery device having a drive wheel movable through a cycle of motion to effect delivery of merchandise, a locking latch for said drive wheel, an electrically positioned release element for effecting the release of said latch from said drive wheel, a pivot for said latch having limited free movement permitting limited movement of said drive wheel in its locked position, a spring urging said latch and in turn the pivot and drive wheel to a normal position, an arm on said latch engaging said electrically positioned release element when the latch is moved by the drive wheel from its normal position rocking said latch to release said drive wheel for operation.

11. In a vending apparatus, an external coin controlled device having a refund mechanism, a manually operated delivery device, a latch with some free movement normally locking said delivery device against complete operation, means actuated by said coin controlled device for displacing said latch to free said delivery device for operation, means to retain said latch in displaced position as long as delivery device is partially operated and linkage means interconnecting said latch and said coin controlled device to indicate such partially operated condition rendering said refund mechanism ineffective.

12. In a coin operated unit for normally locked vending apparatus, a price gauge dimensioned to represent value, a series of channels for retaining coins of different denominations, a feeler at the position of each coin that may be retained in said channels, means to deflect said feelers at the positions at which no coins are retained, movable elements adapted to measure the total values represented by the feelers not so deflected and means to measure the dimensions represented by said total values against said price gauge and to close an electric circuit to unlock said vending apparatus for operation when said total value equals the value represented by said price gauge.

13. In a coin operated unit for vending apparatus, a series of channels for retaining coins of various values, a plate having a surface, a series of coin feelers, means to move said feelers not blocked by coins allowing a feeler to project above said surface for each coin in the channels, a totalizing device movable over said surface until blocked by a projecting pin or pins representing coin values, a price gauge dimensioned to represent value, means to measure limit of movement of credit totalizing device against said price gauge to establish a differential and means to actuate said vending apparatus when said differential is such that the required price and credit conditions are satisfied.

14. In a coin operated unit for vending apparatus, means for receiving coins of various values, a change delivery device, a driven credit element, a driven price element, a series of coin feelers adapted to stop said credit element a distance from a zero reference point proportional to the value of the coins deposited, a presettable price gauge adapted to stop said price element a distance from a zero reference point proportional to the price of the article to be vended, means to actuate said vending apparatus when a predetermined differential is established between said price element and said credit element and means to eject change coins from said change delivery device in proportion to the differential between the price element and the credit element.

15. In a coin controlled vending apparatus, a coin receiving device setting up credit stop points in positions advancing in proportion to the value of the coins received, an article selector adapted to be positioned for article selection and to simultaneously position price stop points for presetting price, driven price elements constrained by said price stop points to be moved distances inversely proportional to the unit price values of a selected article, driven credit elements constrained by said credit stop points to move distances inversely proportional to the unit values of coins deposited and a delivery control element actuated in accordance with the resulting relative positions of said price and credit elements to close an electric circuit when the value of the coins deposited corresponds to the price of the article.

16. In a coin operated unit for vending apparatus of the type that closes an electric circuit when merchandise is delivered, means for receiving coins of various values, a motor driven cam for controlling a cycle of operations in two parts with a stop after each part, a coin operated device adapted to start the operation of said cam for the first part of the cycle, price representing elements, mechanism actuated by said cam during first part of cycle responsive to the total value deposited and to the price representing elements to measure value deposited against price and to close a circuit to said vending apparatus when credit conditions represented by price and deposits are satisfied, means responsive to an electric circuit closure from said vending apparatus to start second part of cycle, mechanism actuated by said cam during second part of cycle to dispose of coins, to restore coin operated unit to normal condition and to stop said cycle of operation.

17. In a coin operated selective vending apparatus of the type employing positionable feelers for article selection, a member having a plurality of selector elements having recesses of varying depths adapted to receive said positionable feelers from said vending apparatus, means tending to move said feelers upon operation of said vending apparatus, a delivery device including a plurality of article ejecting devices and means responsive to said feelers for selecting the article ejecting device for operation and means for positioning any one of said selector elements relative to said feelers for selection of an article.

18. A coin operated unit for a vending apparatus of the type that provides indications when partially operated and closes an electric circuit when merchandise is delivered comprising, a refund device, a coin mechanism adapted during the first part of its cycle to measure price against value of coins inserted and to close a circuit to free said vending apparatus for operation when price and credit conditions are satisfied, means responsive to a package controlled circuit closure from said delivery device to complete a cycle of said coin mechanism, means responsive to the opening of a circuit by partial operation of said vending apparatus to render said coin operated unit ineffective and a mechanical link displaced by said vending apparatus when partially operated adapted to render said refund device ineffective.

19. A coin operated unit for a selective vending apparatus, comprising, means for receiving coins of various values, a dial, an article selector unit mechanically positioned by operation of said dial for interaction with said selective vending apparatus for article selection, a mechanism for measuring price against coins inserted and for closing a circuit to said delivery device when the price and credit conditions have been satisfied, a manually operated refund device adapted to refund deposited coins and a mechanical link adapted to render said refund device ineffective when said vending apparatus has been partially operated.

20. In combination in a coin controlled vending apparatus, a coin operated unit containing a motor driven cam for controlling a cycle of operation in two parts with a stop after each part, an article delivery mechanism adapted to start the second part of the cycle of said cam, a manually operated refund device adapted to refund deposited coins and means to render said refund device ineffective when said delivery mechanism is partially operated or when said cam is being operated by motor.

21. In a vending apparatus, an article selector having recesses of varying depths, a pair of article selection feelers adapted to be moved by operation of the vending apparatus into two of said recesses until stopped, a vending mechanism adapted to respond to the relative positions of said feelers to effect article selection, elements settable in positions as determined by the article selection feelers and article discharging elements operated by the vending mechanism positionable by the settable elements and means to move said article selector to place two of said recesses in alignment with said feelers for article selection.

22. In combination in a coin controlled vending apparatus, a multiple article delivery mechanism, a coin and selector unit having an operative position and inoperative positions relative to said delivery mechanism, the inoperative positions rendering the coin and selector unit mechanism accessible, a positionable member having a plurality of selector elements in said coin and selector unit for article selection, a series of positionable article selection feelers in said delivery device effecting selection of an article for delivery, means to guide said selection feelers into engagement with the selector elements in said coin and selector unit in its operative position such as to effect the positioning of said selection feelers for article selection and coin controlled means to release said delivery mechanism for operation.

23. In a coin operated unit for a selective vending apparatus, means for receiving coins, a spring restored dial having finger holes movable to a stop point, a selector mechanism positionable by operation of said dial for article selection and price setting, a motor operated cam controlling the cycle of operation of said coin operated unit, a coin check mechanism responsive to operation of said dial for determining whether any coin has been received and means responsive to said coin check mechanism only when a coin has been received to render the operation of said dial effective to position said selector mechanism and to close the motor circuit to start the cycle of operation.

24. In a coin operated unit for a selective vending apparatus, means for receiving coins, a manually operable spring restored refund mechanism, a selector mechanism positionable for article selection, a motor operated cam controlling the cycle of operation of said coin operated unit, means responsive to the operation of said refund mechanism to refund deposited coins and to effect the restoral of all parts to normal positions that may be partially operated and an air chamber and piston delaying the restoral of said refund mechanism after operation to insure the completion of its functions.

25. In a coin operated unit for vending apparatus, means for receiving coins of various values, a change delivery device, a driven price element, a driven credit element, a presettable price gauge adapted to stop said driven price element a distance from a zero reference point proportional to the value of the article to be vended, means for advancing step by step a credit stop element proportional to the value of the coins received adapted to stop said driven credit element a distance from a zero reference point proportional to the value of the coins received, means to actuate said vending apparatus when a predetermined differential between said credit element and said price element results from the drive of these elements and means to eject change coins from said change delivery device in proportion to the differential between the credit element and the price element.

26. In a coin operated unit for vending apparatus, a change delivery mechanism, a mechanism receiving coins and establishing a stop point representing number of pennies received and establishing also a stop point representing total number of 5 cent units of value in coins received other than pennies, a presettable price gauge establishing stop points representing price, a checking mechanism engaging said stop points for measuring price against credit and adapted to effect the release of said vending apparatus for operation when predetermined price and credit conditions are satisfied, means in said change delivery mechanism indexing with said checking mechanism to deliver four, three, two or one pennies change coins inversely in number as pennies price exceeds pennies credit and means in said checking mechanism to require one extra 5 cent unit of value in coins other than pennies to effect release of vending apparatus in a transaction requiring pennies change.

27. In a coin operated unit for vending apparatus, a penny credit stop element positionable in accordance with number of pennies deposited, a 5 cent credit stop element positionable in accordance with total value of coins deposited other than pennies, a mechanism transferring five pennies credit from said penny credit stop element to a 5 cent unit of credit on said 5 cent stop element, a presettable price gauge establishing a 5 cent price stop point representing 5 cent units in price of article to be vended and establishing also a penny price stop point representing pennies value in excess of 5 cent units value in price of article and a mechanism for measuring price represented by said price gauge against credit represented by said credit stop elements and for effecting the release of said vending apparatus for operation when the price and credit conditions have been satisfied.

28. In a coin operated unit for vending apparatus, a change delivery mechanism, a mechanism receiving coins and establishing stop points distances from zero reference points representing total values of coins received, a presettable price gauge establishing stop points representing price, a checking mechanism engaging said stop points and establishing mechanical differentials representing comparison of price and credit effecting the release of said vending apparatus for operation when predetermined price and credit conditions are satisfied, means in said change delivery mechanism indexing with said checking mechanism to deliver change coins in accordance with differentials established when credit differs from price and means indexing with supply of change coins to prevent release of said vending apparatus for operation on any transaction requiring change coins when supply of change coins is exhausted.

29. In a coin operated unit for vending apparatus, a change delivery mechanism, a penny credit stop element positionable in accordance with number of pennies deposited, a 5 cent credit stop element positionable in accordance with total value of coins deposited other than pennies, a presettable price gauge establishing a 5 cent price stop point representing 5 cent units in price of article to be vended and establishing also a penny price stop point representing pennies value in excess of total 5 cent units value in price of article, two driven penny check elements one driven until stopped by said penny credit stop element and the other driven against said penny price stop point adapted to establish a differential representing excess pennies price over pennies credit, two driven 5 cent check elements one driven until stopped by said 5 cent stop element and the other driven against said 5 cent price stop point adapted to establish a differential representing excess 5 cent unit credit over 5 cent unit price, a delivery feeler movable relative to said penny check elements and 5 cent check elements to release said vending apparatus for operation when the differentials established in these elements are such as to satisfy predetermined price and credit conditions and means in said change delivery mechanism indexing with said penny check elements and 5 cent check elements to deliver pennies change in accordance with the differential established in the penny check elements and nickels change in accordance with the differential established in the 5 cent check elements.

30. In a coin operated unit for vending apparatus, means for establishing a penny credit stop point unit distances from a zero reference point proportional to number of pennies inserted, means for establishing a 5 cent credit stop point unit distances from a zero reference point proportional to total 5 cent units of value of coins inserted other than pennies, a presettable price gauge establishing a 5 cent price stop point units of distance from a zero reference point corresponding to 5 cent units in price of article to be vended and establishing also a penny price stop point units of distance from a zero reference point corresponding to pennies value in excess of total 5 cent units value in price of article, two penny check elements driven in parallel one until stopped at said penny credit stop point and the other driven against said penny price stop point adapted to establish a differential representing excess pennies price over pennies credit, two 5 cent check elements driven in parallel one until stopped at said 5 cent credit stop point and the other driven against said 5 cent price stop point adapted to establish a differential representing excess 5 cent units of credit over 5 cent units of price, a delivery feeler movable relative to said penny check elements and 5 cent check elements if the differentials established in these elements are both zero said delivery feeler releasing said vending apparatus for operation.

31. A coin operated unit for selective vending apparatus of the type having feelers for article selection, comprising, means for receiving coins of various values, a dial operated unit for article selection and price setting, an electrically releasable delivery device including a circuit, a mechanism for measuring price against value of coins inserted and for closing a circuit to release said delivery device when the price and credit conditions have been satisfied, a series of stops positioned by said dial operated unit for article selection, a series of mechanical feelers indexing with said stops to effect article selection and means responsive to a circuit closure from said delivery device to complete the operation of said coin operated unit and to restore said unit to normal condition.

EDWARD G. WEILER.

References Cited in the file of this patent

UNITED STATES PATENTS

| Number | Name | Date |
|---|---|---|
| 947,755 | Peters et al. | Jan. 5, 1910 |
| 1,003,814 | Scofield | Sept. 19, 1911 |
| 1,468,275 | Briggs | Sept. 18, 1923 |
| 2,279,664 | Du Grenier | Apr. 14, 1942 |
| 2,323,981 | Du Grenier | July 13, 1943 |
| 2,330,186 | Jetsek | Sept. 21, 1943 |
| 2,354,896 | Weiler | Aug. 1, 1944 |
| 2,377,413 | Fry | June 15, 1945 |